(12) United States Patent
Burkart et al.

(10) Patent No.: US 10,504,161 B2
(45) Date of Patent: Dec. 10, 2019

(54) SYSTEMS AND METHODS FOR BASELINING USING MULTIPLE BASELINE METHODOLOGIES

(71) Applicant: InnerWorkings, Inc., Chicago, IL (US)

(72) Inventors: Robert Burkart, Hindsdale, IL (US); Rehan Basheeruddin, Glendale Heights, IL (US); Jenna Baisden, Chicago, IL (US)

(73) Assignee: INNERWORKINGS, INC., Chicago, IL (US)

(*) Notice: Subject to any disclaimer, the term of this patent is extended or adjusted under 35 U.S.C. 154(b) by 332 days.

(21) Appl. No.: 15/368,529

(22) Filed: Dec. 2, 2016

(65) Prior Publication Data

US 2017/0161800 A1 Jun. 8, 2017

Related U.S. Application Data

(60) Provisional application No. 62/262,333, filed on Dec. 2, 2015.

(51) Int. Cl.
*G06Q 30/00* (2012.01)
*G06Q 30/02* (2012.01)
(Continued)

(52) U.S. Cl.
CPC ....... *G06Q 30/0283* (2013.01); *G06F 3/1226* (2013.01); *G06F 3/1273* (2013.01);
(Continued)

(58) Field of Classification Search
None
See application file for complete search history.

(56) References Cited

U.S. PATENT DOCUMENTS

D127,916 S    6/1941   Whitefield
2,738,542 A   3/1956   Clark
(Continued)

OTHER PUBLICATIONS

Prema, K. (2005). For personalized services online is a good bet: Web-based capabilities offer cost, customization benefits. Purchasing, 134(17), 51(2). Retrieved from http://dialog.proquest.com/professional/docview/675099370?accountid=161862 (Year: 2005).*
(Continued)

*Primary Examiner* — Resha Desai
*Assistant Examiner* — Ashley D Preston
(74) *Attorney, Agent, or Firm* — Morgan, Lewis & Bockius LLP

(57) ABSTRACT

Systems and methods for generating baseline candidates are described herein. A method includes: receiving a first set of print specifications associated with a first item in a first product category and retrieving, from the print procurement system, historical purchasing information about a plurality of fulfilled items in the first product category. The method also includes: retrieving an exact tolerance and a similar tolerance associated with the first item. For each item in the plurality of fulfilled items, the method includes: (i) identifying deviations in print specifications associated with a respective fulfilled item when compared to the first set of print specifications, (ii) in accordance with a determination that the deviations satisfy the exact tolerance, designating the respective fulfilled item as an exact baseline match, and (iii) in accordance with a determination that the deviations satisfy the similar tolerance, designating the respective fulfilled item as a similar baseline match.

23 Claims, 30 Drawing Sheets

(51) Int. Cl.
  *G06F 3/12*   (2006.01)
  *G06Q 30/06*  (2012.01)
  *G06Q 10/06*  (2012.01)

(52) U.S. Cl.
  CPC . *G06Q 10/06311* (2013.01); *G06Q 10/06315* (2013.01); *G06Q 30/0611* (2013.01)

(56) References Cited

U.S. PATENT DOCUMENTS

| | | |
|---|---|---|
| 2,850,825 A | 9/1958 | Grants |
| 2,961,250 A | 11/1960 | Beach |
| 3,208,768 A | 9/1965 | Hulbert |
| 4,056,295 A | 11/1977 | Downing |
| 4,082,389 A | 4/1978 | Stewart |
| D251,224 S | 3/1979 | Messenger |
| 4,151,803 A | 5/1979 | Ferrera et al. |
| D253,023 S | 10/1979 | Denhoff |
| D253,465 S | 11/1979 | Lobdell |
| 4,228,904 A | 10/1980 | Dumond |
| D257,823 S | 1/1981 | Maze et al. |
| D263,820 S | 4/1982 | Levenberg |
| 4,519,319 A | 5/1985 | Howlett |
| 4,720,115 A | 1/1988 | Rehrig |
| D294,775 S | 3/1988 | Rechberg |
| D296,737 S | 7/1988 | Bezzerides |
| D300,491 S | 4/1989 | Grossman |
| 4,822,066 A | 4/1989 | Rehrig |
| 5,020,669 A | 6/1991 | Nakagoshi |
| D321,965 S | 11/1991 | Delmerico et al. |
| D333,899 S | 3/1993 | Caceres |
| D335,374 S | 5/1993 | Schulze et al. |
| D340,562 S | 10/1993 | Kean et al. |
| D344,419 S | 2/1994 | Stoddard |
| D349,384 S | 8/1994 | Crinion |
| D352,586 S | 11/1994 | Baucom |
| D356,412 S | 3/1995 | Hensley, Jr. |
| D361,454 S | 8/1995 | Compton et al. |
| 5,451,068 A | 9/1995 | Shockley |
| 5,472,219 A | 12/1995 | Eckstrum |
| D366,745 S | 1/1996 | Kern et al. |
| 5,577,744 A | 11/1996 | Parks |
| D384,466 S | 9/1997 | Taylor |
| D399,648 S | 10/1998 | Hilton |
| D404,236 S | 1/1999 | Bergwall |
| 5,863,053 A | 1/1999 | Berry |
| D410,577 S | 6/1999 | Ciphers |
| 6,023,866 A | 2/2000 | Polsky |
| D426,987 S | 6/2000 | Lewis |
| D427,406 S | 6/2000 | Hartwall |
| 6,126,022 A | 10/2000 | Merkel |
| 6,257,152 B1 | 7/2001 | Liu |
| 6,330,542 B1* | 12/2001 | Sevcik ............. G06Q 10/06316 |
| | | 705/7.26 |
| 6,398,234 B1 | 6/2002 | Brown |
| D472,358 S | 3/2003 | Beese, Jr. |
| 6,570,492 B1 | 5/2003 | Peratoner |
| 6,752,280 B2 | 6/2004 | Dye |
| D501,591 S | 2/2005 | Lucht |
| D503,838 S | 4/2005 | Archambault |
| 6,886,787 B2 | 5/2005 | Stahl |
| 6,979,005 B1 | 12/2005 | McLerran |
| D523,201 S | 6/2006 | Widmer |
| D532,238 S | 11/2006 | Thrush |
| 7,149,983 B1* | 12/2006 | Robertson ........... G06F 16/2428 |
| | | 715/810 |
| 7,197,991 B1 | 4/2007 | Grigsby |
| D547,517 S | 7/2007 | Hernandez |
| D549,920 S | 8/2007 | Dukes |
| 7,273,149 B2 | 9/2007 | Lutes |
| D560,402 S | 1/2008 | Lev |
| D573,324 S | 7/2008 | Hernandez |
| D580,193 S | 11/2008 | Sparkowski |
| 7,481,438 B2 | 1/2009 | Hernandez |
| D591,531 S | 5/2009 | Sparkowski |
| D594,622 S | 6/2009 | Kissun |
| D608,115 S | 1/2010 | Trinh et al. |
| D610,323 S | 2/2010 | Saladino |
| D611,219 S | 3/2010 | Banasik et al. |
| D614,888 S | 5/2010 | Sexton |
| D614,899 S | 5/2010 | Lai |
| D619,844 S | 7/2010 | Johnson |
| D620,669 S | 7/2010 | Hernandez |
| 7,793,485 B2 | 9/2010 | Blocker |
| D626,237 S | 10/2010 | Nordgren et al. |
| D635,801 S | 4/2011 | Stubis |
| D644,039 S | 8/2011 | Naples et al. |
| D644,452 S | 9/2011 | Naples et al. |
| D650,545 S | 12/2011 | Malone et al. |
| D653,893 S | 2/2012 | Huss |
| D654,748 S | 2/2012 | Lu |
| 8,109,391 B2 | 2/2012 | Susnjara |
| D657,591 S | 4/2012 | Sanchez |
| D660,052 S | 5/2012 | Flores |
| D679,466 S | 4/2013 | McCullough |
| D689,715 S | 9/2013 | Wong |
| 8,544,859 B2 | 10/2013 | Itmec et al. |
| D693,159 S | 11/2013 | Lidwell et al. |
| 8,602,443 B2 | 12/2013 | Moore et al. |
| 8,651,298 B2 | 2/2014 | Beaty |
| 8,695,878 B2 | 4/2014 | Burnside et al. |
| D703,975 S | 5/2014 | Huss et al. |
| D707,914 S | 6/2014 | Ward |
| D716,080 S | 10/2014 | Bell et al. |
| D718,077 S | 11/2014 | Schneider, Jr. et al. |
| D722,243 S | 2/2015 | Kehoe et al. |
| 9,004,300 B1 | 4/2015 | Morrell |
| D731,823 S | 6/2015 | Kelinske et al. |
| D732,817 S | 6/2015 | Elstow et al. |
| D733,386 S | 6/2015 | Della Polla |
| D734,413 S | 7/2015 | Bettin et al. |
| D735,510 S | 8/2015 | Volz |
| D735,833 S | 8/2015 | Winstead |
| D739,886 S | 9/2015 | Vetter |
| D740,591 S | 10/2015 | Huss et al. |
| D741,629 S | 10/2015 | Meissner et al. |
| D747,901 S | 1/2016 | Kanagy et al. |
| D748,416 S | 2/2016 | Meissner et al. |
| D752,372 S | 3/2016 | Huff et al. |
| D754,458 S | 4/2016 | Mason |
| D775,871 S | 1/2017 | Volz et al. |
| D784,052 S | 4/2017 | Rodriguez |
| 2002/0008048 A1 | 1/2002 | Ishikawa et al. |
| 2002/0178075 A1 | 11/2002 | Emerick et al. |
| 2003/0121872 A1 | 7/2003 | Gervasi |
| 2003/0195836 A1* | 10/2003 | Hayes ................. G06Q 20/102 |
| | | 705/37 |
| 2003/0205877 A1 | 11/2003 | Verna et al. |
| 2005/0086910 A1 | 4/2005 | Chambers et al. |
| 2005/0151336 A1 | 7/2005 | Neuman |
| 2005/0212242 A1 | 9/2005 | Cheng |
| 2006/0207481 A1 | 9/2006 | McCarthy |
| 2007/0000857 A1 | 1/2007 | Roth |
| 2007/0208630 A1 | 9/2007 | Chatter et al. |
| 2007/0296167 A1 | 12/2007 | Beswick et al. |
| 2009/0134230 A1 | 5/2009 | Stojak et al. |
| 2009/0144070 A1 | 6/2009 | Psota et al. |
| 2009/0234668 A1 | 9/2009 | Wheeler |
| 2010/0030667 A1 | 2/2010 | Chudy et al. |
| 2010/0133128 A1 | 6/2010 | Preece |
| 2010/0133215 A1 | 6/2010 | Norman |
| 2011/0156367 A1 | 6/2011 | King |
| 2012/0132569 A1 | 5/2012 | Susnjara |
| 2013/0062293 A1 | 3/2013 | Beaty |
| 2014/0008884 A1 | 1/2014 | Itmec et al. |
| 2014/0110481 A1 | 4/2014 | Burnside et al. |
| 2014/0116908 A1 | 5/2014 | Beyer |
| 2014/0229000 A1 | 8/2014 | Hoshino |
| 2014/0230295 A1 | 8/2014 | Hawkins |
| 2015/0157145 A1 | 6/2015 | Bussi |
| 2015/0363865 A1* | 12/2015 | Ramanuja .......... G06Q 30/0631 |
| | | 705/26.62 |

(56) References Cited

U.S. PATENT DOCUMENTS

OTHER PUBLICATIONS

Jodi Volz, Notice of Allowance, U.S. Appl. No. 29/488,840, dated Apr. 1, 2015, 7 pgs.
Jodi Volz, Office Action, U.S. Appl. No. 29/488,840, dated Sep. 12, 2014, 5 pgs.
Jodi Volz, Office Action, U.S. Appl. No. 29/488,838, dated Aug. 3, 2015, 5 pgs.
Jodi Volz, Office Action, U.S. Appl. No. 29/488,838, dated Feb. 9, 2016, 6 pgs.
Jodi Volz, Notice of Allowance, U.S. Appl. No. 29/488,838, dated Aug. 22, 2016, 5 pgs.
Jodi Volz, Office Action, U.S. Appl. No. 29/531,752, dated Sep. 11, 2015, 4 pgs.
Jodi Volz, Notice of Allowance, U.S. Appl. No. 29/531,752, dated Dec. 14, 2015, 5 pgs.
Jodi Volz, Office Action, U.S. Appl. No. 29/573,786, dated Jul. 12, 2017, 4 pgs.
Jodi Volz, Notice of Allowance, U.S. Appl. No. 29/573,786, dated Dec. 19, 2017, 5 pgs.
Jodi Volz, Office Action, U.S. Appl. No. 29/488,839, dated Nov. 10, 2015, 5 pgs.
Jodi Volz, Notice of Allowance, U.S. Appl. No. 29/488,839, dated Apr. 21, 2016, 6 pgs.
Jodi Volz, Office Action, U.S. Appl. No. 14/694,872, dated Aug. 5, 2016, 14 pgs.
Jodi Volz, Final Office Action, U.S. Appl. No. 14/694,872, dated Jun. 20, 2017, 18 pgs.
Jodi Volz, Office Action, U.S. Appl. No. 14/694,872, dated Nov. 27, 2017, 5 pgs.
Jodi Volz, Notice of Allowance, U.S. Appl. No. 14/694,872, dated May 3, 2018, 7 pgs.
Jodi Volz, Office Action, U.S. Appl. No. 15/078,922, dated Aug. 17, 2016, 11 pgs.
Jodi Volz, Final Office Action, U.S. Appl. No. 15/078,922, dated Jun. 21, 2017, 13 pgs.
Jodi Volz, Office Action, U.S. Appl. No. 15/078,922, dated Dec. 13, 2017, 5 pgs.
Jodi Volz, Notice of Allowance, U.S. Appl. No. 15/078,922, dated Jul. 3, 2018, 5pgs.
Jodi Volz, Quayle Office Action, U.S. Appl. No. 29/559,017, dated Aug. 24, 2017, 9 pgs.
Jodi Volz, Notice of Allowance, U.S. Appl. No. 29/559,017, dated Jan. 31, 2018, 7 pgs.
Jodi Volz, Notice of Allowance, U.S. Appl. No. 29/559,017, dated May 3, 2018, 6 pgs.
Jodi Volz, Office Action, U.S. Appl. No. 15/420,044, dated Mar. 19, 2019, 31 pgs.

\* cited by examiner

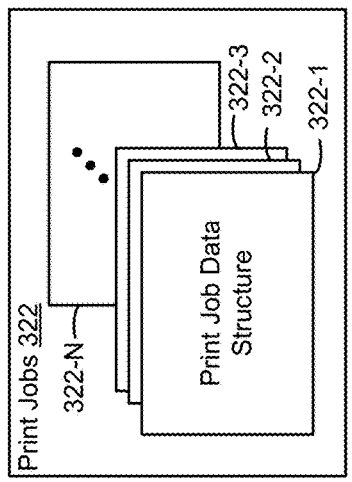

Figure 4A

| Item ID | Job ID | Item Name | Item Type | Fulfilled? | Print Specifications |
|---|---|---|---|---|---|
| 1 | 1 | Spring 2000 Poster | Poster | Yes | {quantity: 1000, finishedSize: 12x12, paperWeight: heavy, coatingInfo: 100# gloss} |
| 2 | 1 | Winter 2003 Poster | Poster | Yes | {quantity: 1100, finishedSize: 12x12, paperWeight: heavy, coatingInfo: 100# gloss} |
| 3 | 2 | Summer 2008 Poster | Poster | Yes | {quantity: 1000, finishedSize: 12x12, paperWeight: medium, coatingInfo: 70# gloss} |
| 4 | 3 | Winter 2013 Poster | Poster | Yes | {quantity: 100000, finishedSize: 12x12, paperWeight: heavy, coatingInfo: 100# gloss} |
| 5 | 4 | Summer 2015 Poster | Poster | No | {quantity: 1000, finishedSize: 12x12, paperWeight: heavy, coatingInfo: 100# gloss} |
| ... | ... | ... | ... | ... | ... |

Figure 4B

| Baseline Match Tolerance Data Structure 324-1 | Item ID | Job ID | Exact Match Tolerance | Similar Match Tolerance | Inferred Match Tolerance |
|---|---|---|---|---|---|
| Header 510-0 | | | | | |
| Record 510-1 | 1 | 1 | {No deviations} | {quantity:10%} | {quantity: 10%, paperWeight: 10#} |
| Record 510-2 | 2 | 2 | {quantity:2%} | {quantity:5%, finishedSize:1%} | {quantity:5%, finishedSize:1%, paperWeight:10#} |
| Record 510-N | ... | ... | ... | ... | ... |

Figure 6D

Alternative User Interface 612

Figure 6E

Alternative User Interface 622

SYSTEMS AND METHODS FOR BASELINING USING MULTIPLE BASELINE METHODOLOGIES

RELATED APPLICATIONS

This application is a non-provisional application of and claims priority to U.S. Provisional Patent Application No. 62/262,333, filed Dec. 2, 2015, entitled, "Systems and Methods for Baselining using Multiple Baseline Methodologies," which is hereby incorporated by reference in its entirety.

TECHNICAL FIELD

The disclosed embodiments relate generally to print procurement systems and, in particular, to generating and presenting exact, similar, and inferred baseline match candidates in a print procurement system.

BACKGROUND

Print procurement systems allow suppliers of printing services to connect with consumers of printing services. Some print procurement systems allow the consumers (or an entity working on their behalf) to provide detailed specifications related to a printing job. These detailed specifications are then used by some print procurement systems to match the printing job with a supplier that is capable of fulfilling the printing job. In order to predict the cost of the print job, previous printing jobs with the same print specifications are identified and the price of individual items in a print job is extrapolated from the same types of items in previously fulfilled print jobs. However, in some cases types of items in a print job and/or numbers of items in a print job vary from previously fulfilled print jobs.

SUMMARY

Without limiting the scope of the appended claims, after considering this disclosure, and particularly after considering the section entitled "Description of Embodiments" one will understand how the aspects of various embodiments are implemented and used to address the above deficiencies and other problems associated with generating and presenting exact, similar, and inferred baseline match candidates in a print procurement system.

Some embodiments identify baseline candidates using multiple baseline methodologies. In some embodiments, the baseline candidates are identified without requiring any user input or human intervention to initiate a process for identifying baseline candidates. In some embodiments, a print procurement system receives a first set of print specifications associated with a first item in a first product category. The print procurement system then, in response to receiving the first set of print specifications and without any user input or other human intervention, identifies exact, similar, and inferred baseline candidates for the first item based on baseline match tolerance levels for the first item (e.g., acceptable deviations from the print specifications for the first item) and based on historical purchasing information about a plurality of fulfilled items in the first product category. A baseline match tolerance includes information identifying acceptable deviations from print specifications for the first item (e.g., quantity can vary by up to 10% or finished size can vary by 1%, etc.), and a fulfilled item with print specifications that satisfy the acceptable deviations can be designated as a baseline match candidate. Additional examples of baseline match tolerances are shown in FIG. 5B and described in more detail below in reference to FIG. 5B. In some embodiments, baseline match tolerances are provided for each type of baseline match methodology used by the print procurement system (e.g., if the system allows for designating exact, similar and inferred baseline match candidates, then the provided baseline match tolerances for each item should include: (i) a first set of exact baseline match tolerances, (ii) a second set of similar baseline match tolerances, and (iii) a third set of inferred baseline match tolerances). In this way, the print procurement system is able to generate and present exact, similar, and inferred baseline match candidates for the first item.

Thus, disclosed embodiments herein improve on prior approaches to algorithmically matching customers with suppliers by providing multiple user configurable evaluation levels for establishing baselines. The baselining approach described herein allows baselines to be established using various criteria, resulting in the potential to evaluate an increased number of suppliers.

(A1) More specifically, some embodiments include a method of generating baseline candidates in a print procurement system. In some embodiments, the method is performed at an electronic device (e.g., one or more of the print procurement servers 106 or one or more of the user computing devices 102, FIG. 1) with one or more processors and memory. The method includes: receiving a first set of print specifications (e.g., including manufacturing specifications, manufacturing methods, and quantity information, as discussed in more detail below) associated with a first item in a first product category. The method further includes: retrieving, from the print procurement system (e.g., retrieving includes querying a server or a database associated therewith, such as one of the one or more print procurement servers 106 and the print job databases 108, FIG. 1) historical purchasing information about a plurality of fulfilled items in the first product category. In some embodiments, the historical purchasing information is used to analyze print specifications associated with previously-fulfilled items in order to locate possible baseline match candidates. The method also includes: retrieving, from the print procurement system, an exact baseline match tolerance and a similar baseline match tolerance associated with the first item. For each item in the plurality of fulfilled items, the method includes: (i) identifying deviations in print specifications associated with a respective fulfilled item when compared to the first set of print specifications, (ii) in accordance with a determination that the deviations satisfy the exact baseline match tolerance, designating the respective fulfilled item as an exact baseline match, and (iii) in accordance with a determination that the deviations satisfy the similar baseline match tolerance, designating the respective fulfilled item as a similar baseline match.

(A2) In some embodiments of the method of A1, retrieving includes retrieving an inferred baseline match tolerance and the method further includes: in accordance with a determination that the deviations satisfy the inferred baseline match tolerance, designating the respective fulfilled item as an inferred baseline match.

(A3) In some embodiments of the method of A2, the method further includes: displaying, on a display of the electronic device, each respective fulfilled item and an indication as to whether each respective fulfilled item has been designated as an exact baseline match, a similar baseline match, or an inferred baseline match. In some embodiments of the method of A2 in which a server is performing the method, displaying instead includes sending information about each respective fulfilled item and an indication as to whether each respective fulfilled item has been designated as an exact baseline match, a similar baseline match, or an inferred baseline match to a device that is separate and distinct from the server.

(A4) In some embodiments of the method of A3, the method further includes: receiving user input, at a location that corresponds to one of the respective fulfilled items that has been designated as either a similar or an inferred baseline match. Based on the user input, the method includes: re-designating the one respective fulfilled item as an exact baseline match.

(A5) In some embodiments of the method of A3, the method further includes: receiving a selection of one of the respective fulfilled items from the display of the electronic device. In accordance with a determination that the selected fulfilled item has been designated as an exact baseline match, the method includes: determining a baseline price for the first item using a first baseline price metric. In accordance with a determination that the selected fulfilled item has been designated as a similar or an inferred baseline match, the method includes: determining a baseline price for the first item using a second baseline price metric that is distinct from the first baseline price metric.

(A6) In some embodiments of the method of A5, the baseline price for the first item includes one or more commodities (e.g., indexed commodities) associated with a variable price.

(A7) In some embodiments of the method of A6, the method further includes: detecting a change in the variable price and determining whether the change satisfies a price threshold (e.g., a price change of greater than 10%). In accordance with a determination that the change satisfies the price threshold, the method includes: adjusting the baseline price.

(A8) In some embodiments of the method of A3, the method further includes: in accordance with a determination that the deviations do not satisfy the exact, similar, and inferred baseline match tolerances, designating the respective fulfilled item as no baseline match.

(A9) In some embodiments of the method of A2, the exact baseline match tolerance specifies a first plurality of deviations from the first set of print specifications, the similar baseline match tolerance specifies a second plurality of deviations from the first set of print specifications, and the inferred baseline match threshold specifies a third plurality of deviations from the first set of print specifications. Additionally, the third plurality of deviations includes more deviations than the first plurality and the second plurality of deviations and the second plurality of deviations includes more deviations than the first plurality of deviations.

(A10) In some embodiments of the method of A1, the first set of print specifications includes quantity, finished size, flat size, paper weight, paper type, print colors, coating information, basic finishing information, complex finishing information, packing information, delivery information, proofing information, substrate selection information, ink information, and kitting information.

(A11) In some embodiments of the method of A1, retrieving the historical purchasing information about the plurality of fulfilled items in the first product category includes retrieving corresponding invoice data associated with the plurality of fulfilled items in the first product category. In addition, the method further includes: discarding historical purchasing information about a respective fulfilled item of the plurality of fulfilled items in accordance with a determination that the historical purchasing information does not match the corresponding invoice data associated with the respective fulfilled item of the plurality of fulfilled items.

In some embodiments, retrieving includes querying a first data structure (e.g., a database that includes information about fulfilled items) to obtain the historical purchasing information about the plurality of fulfilled items in the first product category. In some embodiments, after obtaining the historical purchasing information, the method includes querying a second data structure, distinct from the first data structure, to obtain invoice data corresponding to each item within the plurality of fulfilled items in the first product category. In some embodiments, the first data structure is populated by a first entity (e.g., a provider of the print procurement system) based on information provided by a second entity (e.g., a customer of the provider that is looking to source first item from a new supplier). In some embodiments, the information provided by the second entity may be incomplete or otherwise untrustworthy and, thus, the first entity may need to confirm accuracy of the information. In some embodiments, the second data structure is populated by a third-party that is unrelated to the provider and the first entity and the third-party collects invoice data for fulfilled items associated with the first entity and stores the invoice data in the second data structure. As such, the second data structure, including information identifying actual invoice data for fulfilled items, allows the first entity to perform this confirmation and check the accuracy of the information.

(A12) In some embodiments of the method of A1, the method further includes: in accordance with a determination that the first item has no baseline match candidates (in other words, none of the plurality of fulfilled items was designated as either an exact, similar, or inferred baseline match candidate), grouping the first item with a second item and performing the retrieving and retrieving operations with respect to groups of items that are similar to the first and second items. In other words, if the method is unable to locate a baseline match candidate by search through single historical items, then the method proceeds to search for groups of historical items that may match a group of currently-pending items (i.e., items that have not yet been fulfilled by a supplier). In some embodiments, this is referred to as performing a multi-item baseline and is discussed in more detail below in reference to FIGS. 7A-7B.

In another aspect, a non-transitory computer-readable storage medium is provided. The non-transitory computer-readable storage medium stores executable instructions that, when executed by an electronic device with a display, cause the electronic device to receive a first set of print specifications associated with a first item in a first product category. The instructions further cause the electronic device to retrieve, from the print procurement system, historical purchasing information about a plurality of fulfilled items in the first product category. The instructions additionally cause the electronic device to retrieve, from the print procurement system, an exact baseline match tolerance and a similar baseline match tolerance associated with the first item. The instructions additionally cause the electronic device to, for each fulfilled item in the plurality of fulfilled items: identify deviations in print specifications associated with a respective fulfilled item when compared to the first set of print specifications; in accordance with a determination that the deviations satisfy the exact baseline match tolerance, designate the respective fulfilled item as an exact baseline match; and in accordance with a determination that the deviations satisfy the similar baseline match tolerance, designate the respective fulfilled item as a similar baseline match.

In an additional aspect, an electronic device with a display, memory, and one or more processors is provided. The memory stores one or more programs which, when executed by the one or more processors, cause the electronic device to receive a first set of print specifications associated with a first item in a first product category. The one or more programs further cause the electronic device to retrieve, from the print procurement system, historical purchasing information about a plurality of fulfilled items in the first product category. The one or more programs additionally cause the electronic device to retrieve, from the print procurement system, an exact baseline match tolerance and a similar baseline match tolerance associated with the first item. The one or more programs additionally cause the electronic device to, for each fulfilled item in the plurality of fulfilled items: identify deviations in print specifications associated with a respective fulfilled item when compared to the first set of print specifications; in accordance with a determination that the deviations satisfy the exact baseline match tolerance, designate the respective fulfilled item as an exact baseline match; and in accordance with a determination that the deviations satisfy the similar baseline match tolerance, designate the respective fulfilled item as a similar baseline match.

Thus methods, systems, and electronic devices are provided that enable users to easily and intuitively generate baseline candidates in a print procurement system.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

FIGS. 4A-4B are block diagrams illustrating data structures for storing information about print jobs, in accordance with some embodiments.

FIGS. 6A-6F illustrate user interfaces for displaying and interacting with information about print jobs and for generating and displaying baseline match candidates, in accordance with some embodiments.

Figure 1:
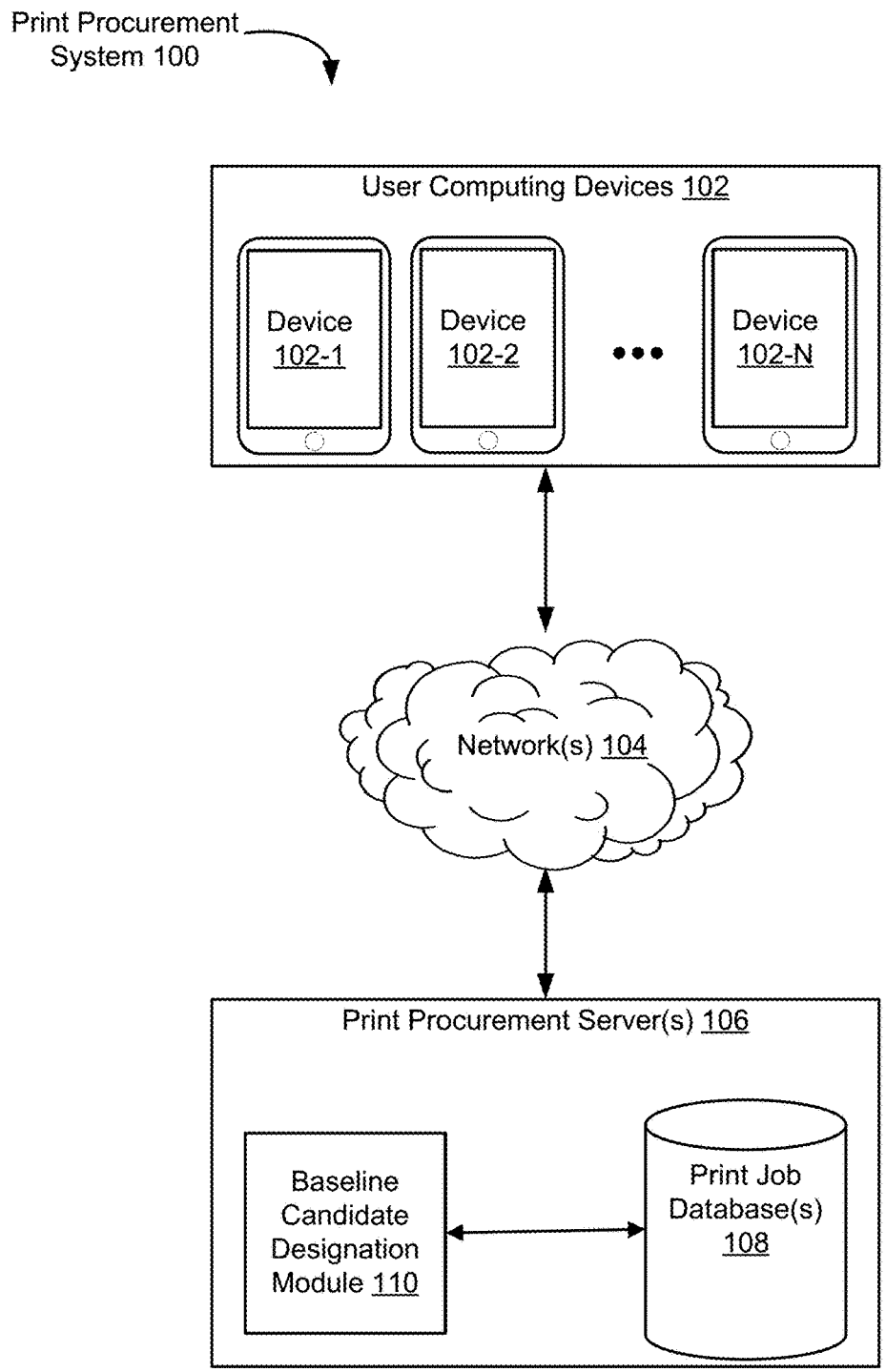
FIG. 1 illustrates an exemplary print procurement system, in accordance with some embodiments.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EMBODIMENTS

Disclosed embodiments provide techniques for generating baselines candidates using varying degrees of adherence between past and current project specifications, providing enhanced flexibility for identifying baseline candidates. Therefore, the disclosed embodiments improve print procurement systems by facilitating generation of a greater number of potential baseline candidates.

FIG. 1 illustrates a print procurement system 100 in which some embodiments operate. One or more users each interact with one or more user computing devices 102 (also referred to as computing device 102 and device 102), such as a desktop computer, a laptop computer, a tablet computer, a tablet, a mobile computing device, a mobile phone, or a virtual machine running on such a device. In some embodiments, one or more user devices 102 are used by a customer user (e.g., personnel from an entity that generates print orders). In some embodiments, one or more user devices 102 are used by a supplier user (e.g., personnel from an entity that bids on and/or fulfills print orders). In some embodiments, one or more user devices 102 are used by a facilitator user (e.g., personnel from an entity that provides and/or maintains the software and/or hardware for receiving information (e.g., orders) from customers and receiving information (e.g., bids) from suppliers.

An example computing device 102-1 is described below with respect to FIG. 2, including various software programs or modules that execute on the computing device 102-1. In some embodiments, the computing device 102-1 includes a web browser 220 (FIG. 2) that is capable of executing a print procurement web application 222 (FIG. 2), a print procurement application 224 (FIG. 2), a baseline candidate designation module 226, a print job data fetching module 228 that the computing device 102-1 (or an application installed thereon such as print procurement application 224) uses to generate baseline candidates. Some embodiments can generate baseline candidates for use in a print procurement system without connecting to external databases or programs over a network (i.e., the generating of baseline candidates is performed exclusively on the user computing device 102-1).

In some embodiments of the print procurement system 100, the user computing devices 102 communicate with the one or more print procurement servers 106 over one or more networks 104. The one or more networks (e.g., network(s) 104) communicably connect each component of the print procurement system 100 with other components of the print procurement system 100. In some embodiments, the one or more networks 104 include public communication networks, private communication networks, or a combination of both public and private communication networks. For example, the one or more networks 104 can be any network (or combination of networks) such as the Internet, other wide area networks (WAN), local area networks (LAN), virtual private networks (VPN), metropolitan area networks (MAN), peer-to-peer networks, and/or ad-hoc connections.

Figure 2:
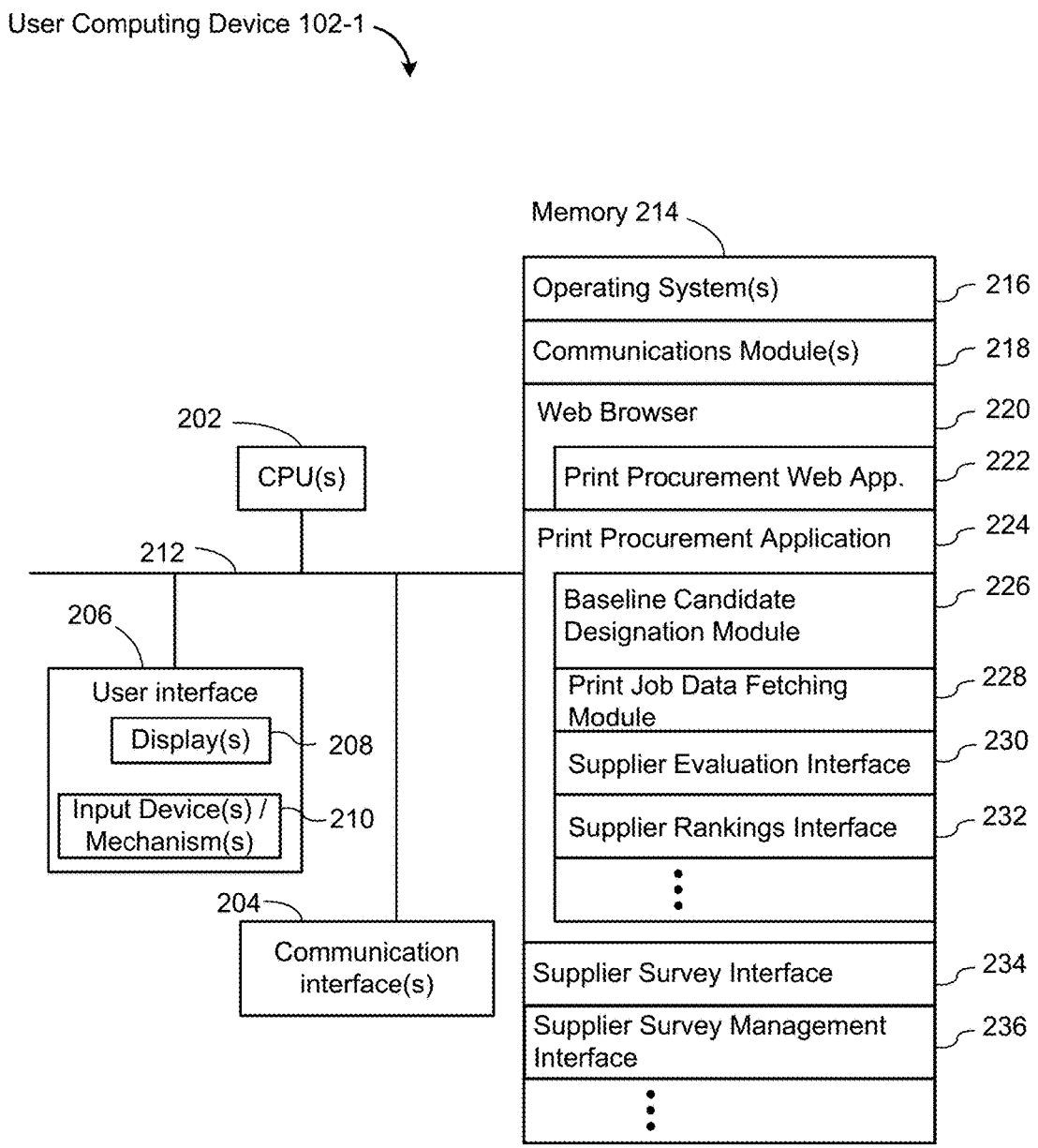
FIG. 2 is a block diagram of a computing device, in accordance with some embodiments.
Figure 3:
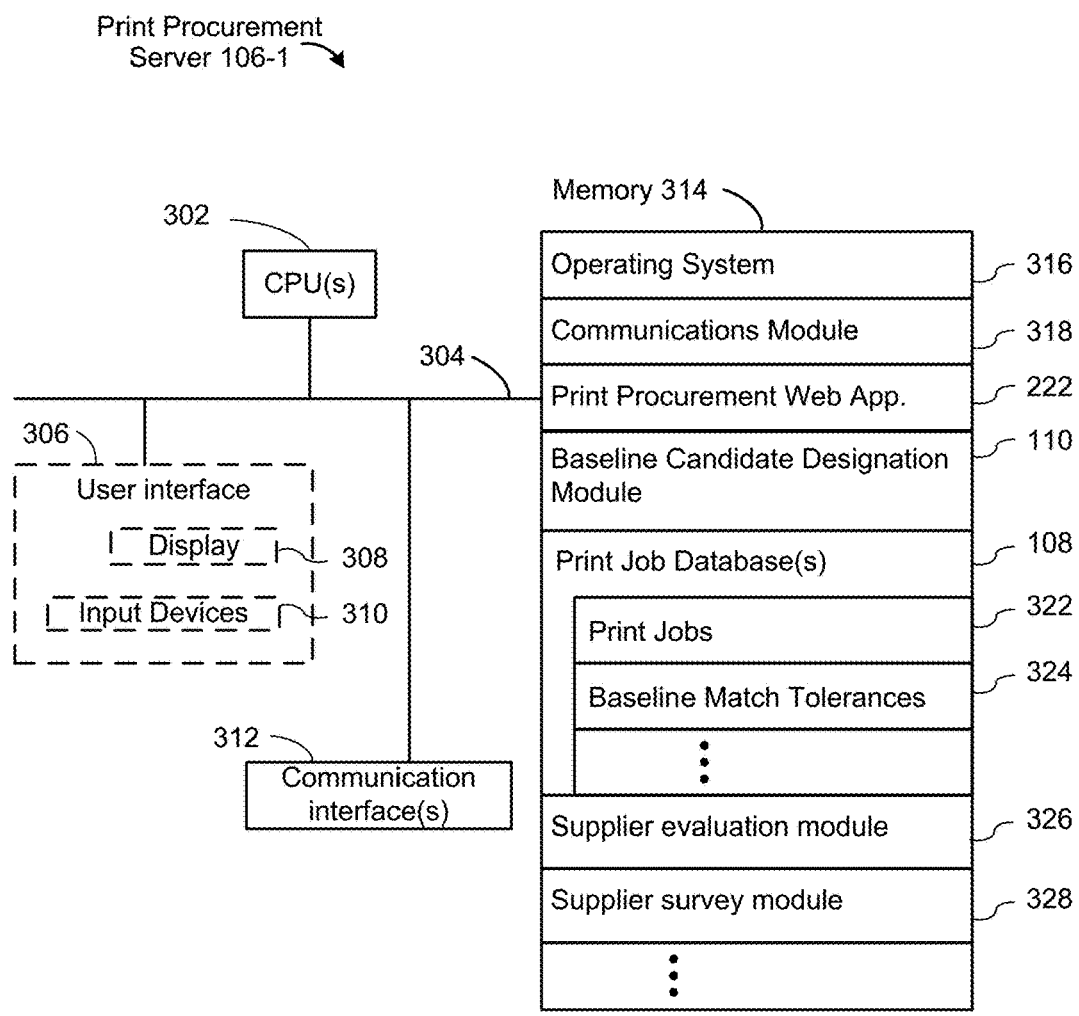
FIG. 3 is a block diagram of a print procurement server, in accordance with some embodiments.

An exemplary print procurement server 106-1 (also referred to herein as a server 106-1) is described in more detail with respect to FIG. 3. As mentioned above, some embodiments provide a print procurement web application 222 (FIG. 2) that runs wholly or partially within a web browser 220 (FIG. 2) on the computing devices 102. In some embodiments, print procurement functionality is provided by both a local print procurement application 224 and certain functions are provided by the one or more servers 106. For example, the one or more servers 106 may be used for resource-intensive operations.

In some embodiments, the computing devices 102 connect to one or more remotely-located print procurement servers 106 through communication network(s) 104. In this way, some print procurement operations can be performed remotely and computing resources at the computing devices 102 can be preserved for other operations. For example, operations requiring input from a user are performed at the computing devices 102 (e.g., the user interacts with one or more user interfaces provided on the computing devices 102 (such as the user interfaces shown in FIGS. 6A-6F and 8A-8P) and information identifying user input and user interactions at the user interfaces are sent to the remotely-located print procurement servers 106 for storage and/or further processing).

The one or more print procurement servers 106, in some embodiments, include a baseline candidate designation module 110 that designates fulfilled print items as exact, similar, inferred, or no match baseline candidates for a newly-created print item based on baseline match tolerances. For example, print specifications for print items (i.e., fulfilled and newly-created print items) can be sent to the one or more print procurement servers 106 through the communication network(s) 102 for processing by the baseline candidate designation module 110 (i.e., for identifying baseline candidates for each of the newly-created print items). In some embodiments, sending and processing at least a portion of print items for processing at the one or more print procurement servers 106 preserves computing resources at the computing devices 102 (i.e., because the servers 106 perform the data-intensive operations, such as scanning through large volumes of information in order to identify baseline candidates, computing resources at the computing devices 102 are preserved for rendering user interfaces and for sending/receiving data to/from the servers 106). In some embodiments, the allocation of operations between the computing devices 102 and the servers 106 is determined in accordance with bandwidth limitations at the computing devices 102. For example, by monitoring a history of bandwidth usage against available bandwidth at a respective computing device 102, a baseline measurement for bandwidth requirements at the respective computing device 102 can be established (e.g., if after observing/monitoring bandwidth usage for a predefined period of time (e.g., 2 days), bandwidth usage averages 100 MB per hour, then 100 MB hour can be established as the baseline).

By establishing the baseline, a determination can then be made to determine whether to perform a data-intensive operation at the computing device 102 or at one of the servers 106. For example, in accordance with a determination that a first operation (e.g., identifying baseline candidates) requires more than a predefined percentage (e.g., 10%, 20%, or 30%) of the baseline bandwidth, then the first operation should be performed at one of the severs 106 and not at the computing device 102. In some embodiments, the baseline bandwidth is a baseline measured against bandwidth usage over 20 minutes, 45 minutes, 1.5 hours, 6 hours, or the like.

In some embodiments, the determination as to which device should perform a particular operation is based on where data required by the particular operation is stored. For example, if the particular operation requires data that is stored in a respective print job database 108 (FIG. 1), then the particular operation can be performed more efficiently at one of the servers 106, because the required data can be queried/retrieved/processed locally and without having to sending that data back and forth using the networks 104, in order to communicate that data to one of the computing devices 102.

In some embodiments, the information about fulfilled print items (e.g., print specifications for each of the fulfilled print items, purchasing information, supplier information, etc.), newly-created print items (e.g., print specifications for each of the fulfilled print items, associated baseline match tolerances for the newly-created items), and baseline candidates are all stored in the one or more print job databases 108 for easy access and storage.

In some embodiments, the print procurement system 100 is provided by a print procurement service provider. The print procurement service provider connects entities requiring print jobs to create printed materials (e.g., banners, posters, business cards, etc.) with suppliers capable of fulfilling the print jobs. In some embodiments, print jobs each include one or more items (i.e., items of printed material). In some embodiments, the entities requiring the print jobs rely on the print procurement service provider to locate suppliers on their behalf. Typically, the print procurement service provider assigns a print procurement manager ("PPM") to the entity and the PPM is responsible for interacting with the print procurement system 100 (e.g., through the print procurement web application or print procurement application) to locate appropriate suppliers. In some embodiments, the entities requiring print jobs are referred to herein as clients of the print procurement system or as clients of the print procurement service provider. In some embodiments, a PPM or some other representative of the client interacts with the print procurement application or the print procurement web application.

FIG. 2 is a block diagram illustrating one of the computing devices 102 (e.g., computing device 102-1). In some embodiments, computing device 102 is a customer device that a user uses to interact with a locally-installed print procurement application (e.g., print procurement application 224) and/or to interact with a print procurement web application (e.g., print procurement web application 222) using a web browser (e.g., web browser 220), in accordance with some embodiments. In some embodiments, computing device 102 is a supplier device that a user uses to interact with a locally installed supplier portal and/or to interact with a supplier portal web application. In some embodiments, computing device 102 is a facilitator device that a user uses to perform administration tasks such as reviewing information provided by customers and suppliers and/or managing software and/or hardware used by customers and facilitators, e.g., using a locally installed application and/or a web application.

A computing device 102-1 typically includes one or more processing units/cores (CPUs/GPUs) 202 for executing modules, programs, and/or instructions stored in the memory 214 and thereby performing processing operations; one or more network or other communications interfaces 204; the memory 214; and one or more communication buses 212 for interconnecting these components. The communication buses 212 may include circuitry that interconnects and controls communications between system components.

The computing device 102-1 also includes a user interface 206 that includes a display device 208 and/or one or more input devices or mechanisms 210, such as a mouse, keyboard, stylus, and/or touchscreen display. In some embodiments in some embodiments, the input device/mechanism includes a "soft" keyboard, which is displayed as needed (e.g., in response to a user tapping a user input element that requires input from a keyboard, the soft keyboard is displayed) on the display device 208, enabling a user to "press keys" that appear on the display 208. In some embodiments, the display 208 and input device/mechanism 210 comprise a touch-screen display (also called a touch-sensitive display).

In some embodiments, the computing device 102-1 has memory 214 that includes high-speed random access memory, such as DRAM, SRAM, DDR RAM, or other random access solid state memory devices. In some embodiments, the memory 214 includes non-volatile memory, such as one or more magnetic disk storage devices, optical disk storage devices, flash memory devices, or other non-volatile solid-state storage devices. Optionally, the memory 214 includes one or more storage devices remotely located from the CPU(s)/GPUs 202. The memory 214, or alternately the non-volatile memory device(s) within the memory 214, comprises a non-transitory computer-readable storage medium. In some embodiments, the memory 214, or the non-transitory computer-readable storage medium of the memory 214, stores the following programs, modules, and data structures, or a subset thereof:

- an operating system 216, which includes procedures for handling various basic system services and for performing hardware dependent tasks;
- a communications module 218, which is used for connecting the computing device 102-1 to computers and devices via the one or more communication interfaces 204 (wired or wireless) and one or more communication networks 104 (FIG. 1), such as the Internet, other wide area networks, local area networks, metropolitan area networks, and so on;
- a web browser 220 (or other client-side application capable of displaying web pages), which enables a user to communicate over a network with remote computers, servers, and/or devices. In some embodiments, the web browser 220 executes a print procurement web application 222 provided by one or more print procurement servers 106 (e.g., by receiving information about web pages from the server 104 as needed to fulfill requests to view information). In some embodiments, a print procurement web application 222 is an alternative to storing a print procurement application 224 locally on the computing device 102-1;
- a print procurement application 224, which enables users to interact with a print procurement system 100 (FIG. 1). In some embodiments, the print procurement application 224 retrieves information from one or more print job databases 108 (FIG. 1) that are stored on one or more print procurement server(s), then generates and displays the retrieved information in user interfaces that allow the users to, for example, create print jobs, identify print suppliers, select print suppliers, and generate baseline candidates using multiple baseline methodologies (e.g., some exemplary user interfaces are shown in FIGS. 6A-6F and 8A-8P). In some instances, the print procurement application 224 invokes other modules (either on the computing device 102-1 or at one or more print procurement servers 106, to generate baseline candidates using multiple baseline methodologies, as described in more detail below. The print procurement application 224 also includes one or more of the following additional modules, or a subset or superset thereof:
  - a baseline candidate designation module 226 for designating historical (i.e., previously fulfilled) print jobs (or items within a print job) as baseline candidates for an unfulfilled or newly-created print job (or item within a print job);
  - a print job data fetching module 228 for retrieving information from databases that are locally-stored on the device 102-1 or that are remotely-located from the device 102-1 (e.g., from one or more print job databases 108 on one or more print procurements servers 106);
  - supplier evaluation interface 230 for displaying prompts for a user to provide supplier evaluation input and/or for displaying information (e.g., evaluation results) about suppliers; and/or
  - supplier rakings interface 232 for displaying information about suppliers and/or controls for altering the way in which information about suppliers is displayed.

In some embodiments, the memory 214, or the non-transitory computer-readable storage medium of the memory 214, further stores a supplier survey interface 234 that is used by suppliers to provide and/or edit information about supplier capabilities.

In some embodiments, the memory 214, or the non-transitory computer-readable storage medium of the memory 214, further stores a supplier survey management interface 236 that is used by a facilitator to review information provided by suppliers using supplier survey interface 234.

Each of the above identified executable modules, applications, or sets of procedures may be stored in one or more of the previously-mentioned memory devices, and corresponds to a set of instructions for performing a function described above. The above-identified modules or programs (i.e., sets of instructions) need not be implemented as separate software programs, procedures, or modules, and thus various subsets of these modules may be combined or otherwise re-arranged in various embodiments. In some embodiments, the memory 214 may store a subset of the modules and data structures identified above. Furthermore, the memory 214 may store additional modules or data structures not described above. In some embodiments, the programs, modules, and data structures stored in the memory 214, or the non-transitory computer-readable storage medium of the memory 214, provide instructions for implementing some of the methods described below.

Although FIG. 2 shows a computing device 102-1 in accordance with some embodiments, FIG. 2 is intended more as a functional description of the various features that may be present rather than as a structural schematic of the embodiments described herein. In practice, and as recognized by those of ordinary skill in the art, items shown separately could be combined and some items could be separated.

FIG. 3 is a block diagram illustrating a print procurement server 106-1 (e.g., one or the one or more print procurement servers 106, FIG. 1), in accordance with some embodiments. The print procurement server 106-1 may host one or more print job databases 108 and may provide various executable applications or modules. A server 106-1 typically includes one or more processing units (CPUs/GPUs) 302, one or more network interfaces 304, a memory 314, and one or more communication interface(s) 312 for interconnecting these components. In some embodiments, the server 106-1 optionally includes a user interface 306, which includes a display device 308 and one or more input devices 310, such as a keyboard and a mouse.

The memory 314 includes high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. In some embodiments, the memory 314 includes one or more storage devices remotely located from the CPU(s)/GPUs 302. The memory 314, or alternately the non-volatile memory device(s) within the memory 314, includes a non-transitory computer-readable storage medium. In some embodiments, the memory 314 or the non-transitory computer-readable storage medium of the memory 314 stores the following programs, modules, and data structures, or a subset thereof:

- an operating system 316, which includes procedures for handling various basic system services and for performing hardware dependent tasks;
- a network communications module 318, which is used for connecting the server 106-1 to other computers via the one or more communication interfaces 304 (wired or wireless) and one or more communication networks 104 (FIG. 1), such as the Internet, other wide area networks, local area networks, metropolitan area networks, and so on;
- a print procurement web application 222 (or information about the print procurement application), which may be downloaded and executed by a web browser 220 (FIG. 2) on a user's computing device 102. In some embodiments, the print procurement web application 222 allows the server 106-1 to serve information related to the print procurement system 100 to one or more user computing devices 102 (FIG. 1);
- a baseline candidate designation module 110 for designating historical (i.e., previously fulfilled) print jobs (or items within a print job) as baseline candidates for an unfulfilled print job (or item within a print job);
- one or more print job databases 108 for storing information about print jobs. In some embodiments, the one or more print job databases 108 include one or more of the following additional modules, or a subset or superset thereof:
  - information about print jobs 322, such as print specifications associated with each line item within a respective print job, baseline candidates associated with the respective line item, and the like, and as discussed in more detail below in reference to FIGS. 4A-4B; and
  - information about baseline match tolerances 324 associated with items in a print job, as discussed in more detail below in reference to FIGS. 5A-5B;
- a supplier evaluation module 326 that performs evaluation operations, e.g., receiving user provided supplier evaluation input, determining evaluation values, and/or transmitting supplier evaluation information for display by a remote device; and
- a supplier survey module 328 that is used to:
  - generate user interfaces for receiving survey definitions (e.g., from facilitators and/or suppliers),
  - receive and store information entered into surveys (e.g., from suppliers), and/or
  - evaluate information entered into surveys.

Each of the above identified executable modules, applications, or sets of procedures may be stored in one or more of the previously-mentioned memory devices, and corresponds to a set of instructions for performing a function described above. The above-identified modules or programs (i.e., sets of instructions) need not be implemented as separate software programs, procedures, or modules, and thus various subsets of these modules may be combined or otherwise re-arranged in various embodiments. In some embodiments, the memory 314 may store a subset of the modules and data structures identified above. Furthermore, the memory 314 may store additional modules or data structures not described above. In some embodiments, the programs, modules, and data structures stored in the memory 314, or the non-transitory computer-readable storage medium of the memory 314, provide instructions for implementing some of the methods described below.

In some embodiments, the server 106-1 and the components thereon (e.g., print job databases 108) are implemented using a customized version of Microsoft Dynamics® AX on the back-end of the system.

Although FIG. 3 shows a server 106-1, FIG. 3 is intended more as a functional description of the various features that may be present rather than as a structural schematic of the embodiments described herein. In practice, and as recognized by those of ordinary skill in the art, items shown separately could be combined and some items could be separated. In addition, some of the programs, functions, procedures, or data shown above with respect to a server 106-1 may be stored on a computing device 102-1. In some embodiments, the functionality and/or data may be allocated between one or more computing devices 102 and one or more servers 106 (as explained in more detail above in reference to FIG. 1). Furthermore, one of skill in the art recognizes that FIG. 3 need not represent a single physical device. In many embodiments, the server functionality is allocated across multiple physical devices that comprise a server system. As used herein, references to a "server" or "print procurement server" include various groups, collections, or arrays of servers that provide the described functionality, and the physical servers need not be physically collocated (e.g., the individual physical devices could be spread throughout the United States or throughout the world).

FIGS. 4A-4B are block diagrams illustrating data structures for storing information about print jobs, in accordance with some embodiments. As shown in FIG. 4A, print jobs 322 (e.g., those that are included in the databases 108, FIG. 3) include a collection of data structures 322, optionally implemented as a collection of tables for each particular client of a print procurement system 100, that each store information about print jobs associated with the particular client of the print procurement system 100 (e.g., print job data structure 322-1 stores information about print jobs for client 1 of the print procurement system 100 and print job data structure 322-2 stores information about print jobs for client 2 of the print procurement system 100). In some embodiments, each table (e.g., table 322-1, 322-2, 322-3 . . . 322-N) in the collection of print job data structures stores information about print jobs for more than one client (e.g., print job data structure 322-1 stores information about print jobs for client 1 and for client 3, because clients 1 and 3 are related corporate entities and often request similar or overlapping print jobs, making storage in a single table an efficient option).

In some embodiments, determining whether to store information about print jobs for more than one client or for a single client in a respective table 322 is determined when a new client begins using the print procurement system. For example, the print procurement system scans through the print job data structures 322 in order to determine whether any related corporate entities, associated with a new client, are already enrolled and using the print procurement system. In accordance with a determination that a related corporate entity, associated with the new client, is using the print procurement system, then a respective print job data structure 322 associated with the related corporate entity is formatted to store information about print jobs associated with the new client in addition to the related corporate entity. In some embodiments, the new client, while enrolling to use the print procurement system, provides information about related corporate entities and this information is used to efficiently scan through the print job data structures 322 (e.g., the scan only looks for information about related corporate entities matching those provided by the new client).

In some embodiments, the clients are customers of the print procurement service provider (discussed above in reference to FIG. 1). In some embodiments, the clients are each assigned to a print procurement manager ("PPM") responsible for interacting with the print procurement system and locating suppliers to fulfill print jobs on behalf of their assigned clients.

In some embodiments, one or more print job data structures 322 (e.g., print job data structure 322-1, FIG. 4B) are used for storing information about print jobs associated with a particular client of the print procurement system 100. As illustrated in FIG. 4B, print job data structure 322-1 contains data (e.g., print job ID, line item, product type, fulfilled, and print specifications) associated with print jobs for client 1. In some embodiments, the data is stored in individual records 410-1, 410-2, 410-3, 410-4, 410-5 through 410-N. In some embodiments, a header field 410-0 is used to describe each field of information associated with each of the respective records. Header 410-0, in some embodiments, contains a brief description of each field of information (e.g., each field associated with each of the records) stored within the table. As shown in FIG. 4B, header 410-0 indicates that each record 410-1, 410-2, 410-3, 410-4, 410-5 through 410-N stores the following information and data structures, or a subset or superset thereof:

- a value for an "item ID" field that uniquely identifies each line item within a particular print job;
- a value for a "print job ID" field that uniquely identifies each particular print job. In some embodiments, each particular print job is associated with one or more line items;
- a value for an "item name" field that corresponds to descriptive text about a line item within a print job (e.g., descriptive text provided by the client (or by a PPM working on behalf of the client) at the time of creating a print job, such as the text provided in a name entry field 850, FIG. 8D);
- a value for an "item type" field that corresponds to information about the type of product associated with the line item with which the record is associated (e.g., information selected or provided by a user at the time of creating a line item within a print job (e.g., provided by selecting an option within the item dropdown field 851 of FIG. 8D));
- a value for a "fulfilled?" field that corresponds to information indicating whether a line item (or print job that includes the line item) associated with the record has been fulfilled by a supplier (in other words the fulfilled field indicates whether the line item is completed or is awaiting completion); and
- a value for a "print specifications" field that includes a set of information provided by the client (or by a PPM working on behalf of the client) that describes the print requirements for the particular line item (e.g., information provided in one or more item specifications windows, such as exemplary item specifications windows shown in FIGS. 8E-8H). In some embodiments, the set of information in the print specifications field includes values for each of the following print specifications: quantity, finished size, flat size, paper weight, paper type, print colors, coating information, basic finishing information, complex finishing information, packing information, delivery information, proofing information, substrate selection information, ink information, and kitting information. In other embodiments, the set of information in the print specifications field includes values for only one or more of the aforementioned print specifications.

In some embodiments, print job data structure 322-1 includes fields in addition to the fields described above, such as a timestamp field that identifies when a respective line item was created and/or stored in the table 322-1, a related line items field that includes one or more item ID values that correspond to line items that are associated with similar print specifications, and/or a supplier assigned field that indicates whether the particular line item has been assigned/associated with a capable supplier (i.e., a supplier with appropriate printing equipment to fulfill the line item in accordance with the provided print specifications that are associated with the line item).

As shown in FIG. 4B, the print job data structure 322-1 includes records 410-1, 410-2, 410-3, 410-4, 410-5 through 410-N. As one example of the information stored in an exemplary record in the print job data structure 322-1, record 410-1 stores a value of "1" in the item ID field, a value of 1 in the job ID field, a value of "Spring 2000 Poster" in the item name field, a value of "Poster" in the item type field, a value of "Yes" in the fulfilled field, and a value of "{quantity: 1000, finishedSize: 12×12, paperWeight: heavy, coatingInfo: 100# gloss}" in the print specifications field.

Although illustrated as a particular implementation of a data structure (e.g., a table), the data structures of FIGS. 4A-4B, in some embodiments, are implemented in XML files, tables within a relational database, a document-oriented database, text files, and/or any other suitable format for storing data.

Figures 5A, 5B:
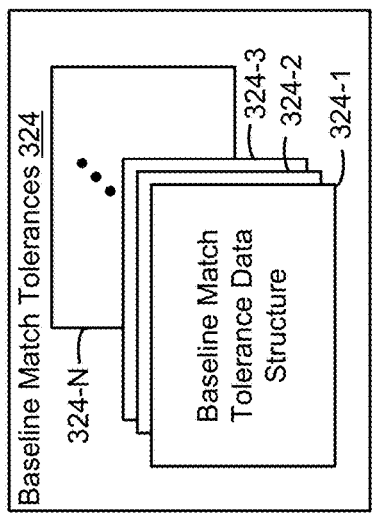
FIGS. 5A-5B are block diagrams illustrating data structures for storing information about baseline match tolerances, in accordance with some embodiments.

FIGS. 5A-5B are block diagrams illustrating data structures for storing information about baseline match tolerances, in accordance with some embodiments. As shown in FIG. 5A, baseline match tolerance data structures 324 include a collection of data structures 324, optionally implemented as a collection of tables for each particular client of the print procurement system 100, that each store baseline match tolerances associated with a particular client of the print procurement system 100 (e.g., baseline match tolerance data structure 324-1 stores baseline match tolerances client 1's print jobs and baseline match tolerance data structure 324-2 stores baseline match tolerances client 2's print jobs). In some embodiments, each table (e.g., table 324-1, 324-2, 324-3 . . . 324-N) in the collection of calendar entry data structures stores baseline match tolerances for more than one client of the print procurement system.

In some embodiments, one or more baseline match tolerance data structures 324 (e.g., baseline match tolerance data structure 324-1, FIG. 5B) are used for storing baseline match tolerances associated with a client of the print procurement system 100 (or for storing baseline match tolerances associated with each print job associated with the client). As illustrated in FIG. 5B, baseline match tolerance data structure 324-1 contains data (e.g., item ID, job ID, exact match tolerance, similar match tolerance, and inferred match tolerance) associated with line items and print jobs for the client. In some embodiments, the data is used to generate baseline match candidates in accordance with the specified tolerances. For example, the similar match tolerance field specifies acceptable deviations in print specifications (e.g., quantity can deviate by +/−10%) that are used to locate previously-fulfilled line items that have print specifications that satisfy the similar match tolerance (e.g., quantity deviates by 5%, but all other print specifications match). In some embodiments, the data is stored in individual records 510-1, 510-2 through 510-N. In some embodiments, a header field 510-0 is used to describe each field of information associated with each of the respective records. Header 510-0, in some embodiments, contains a brief description of each field of information (e.g., each field associated with each of the records) stored within the table. As shown in FIG. 5B, header 510-0 indicates that each record 510-1, 510-2 through 510-N stores the following information and data structures, or a subset or superset thereof:

a value for an "item ID" field that uniquely identifies each line item within a particular print job;

a value for a "print job ID" field that uniquely identifies each particular print job. As mentioned above, in some embodiments, each particular print job is associated with one or more line items;

a value for an "exact match tolerance" field that specifies a set of deviations in print specifications for a first line item that, if satisfied by a second line item (e.g., comparing print specifications associated with the second line item, such as those stored in a respective print job data structure 322, FIG. 4A, to print specifications associated with the first line item to determine whether any deviations in print specifications for the second line item satisfy the deviations specified in the exact match tolerance field), allow the second line item to be designated as an exact match baseline candidate for the first line item. In some embodiments, the set of deviations for the exact match tolerance field are specified by a PPM that is responsible for locating a supplier for the first line item (e.g., the PPM establishes the set of deviations after agreeing with a customer requesting sourcing of the first line item about the deviations that are acceptable for exact baseline matches);

a value for a "similar match tolerance" field that specifies a set of deviations in print specifications for a first line item that, if satisfied by a second line item (e.g., comparing print specifications associated with the second line item, such as those stored in a respective print job data structure 322, FIG. 4A, to print specifications associated with the first line item to determine whether any deviations in print specifications for the second line item satisfy the deviations specified in the similar match tolerance field), allow the second line item to be designated as a similar match baseline candidate for the first line item. In some embodiments, the set of deviations for the similar match tolerance field are specified by a PPM that is responsible for locating a supplier for the first line item (e.g., the PPM establishes the set of deviations after agreeing with a customer requesting sourcing of the first line item about the deviations that are acceptable for similar baseline matches); and a value for an "inferred match tolerance" field that specifies a set of deviations in print specifications for a first line item that, if satisfied by a second line item (e.g., comparing print specifications associated with the second line item, such as those stored in a respective print job data structure 322, FIG. 4A, to print specifications associated with the first line item to determine whether any deviations in print specifications for the second line item satisfy the deviations specified in the inferred match tolerance field), allow the second line item to be designated as an inferred match baseline candidate for the first line item. In some embodiments, the set of deviations for the inferred match tolerance field are specified by a PPM that is responsible for locating a supplier for the first line item (e.g., the PPM establishes the set of deviations after agreeing with a customer requesting sourcing of the first line item about the deviations that are acceptable for inferred baseline matches).

In some embodiments, baseline match tolerance data structure 324-1 includes fields in addition to the fields described above, such as a "contract ID" field that includes information identifying a contract from which the baseline match tolerance information was retrieved. For example, when a respective client agrees to employ the services provided by the print procurement service provider, the client and the service provider agree to a set of terms that are embodied in a contract. In some instances, that contract includes baseline match tolerance information for each print job or for each line item within each print job.

Figure 6A:
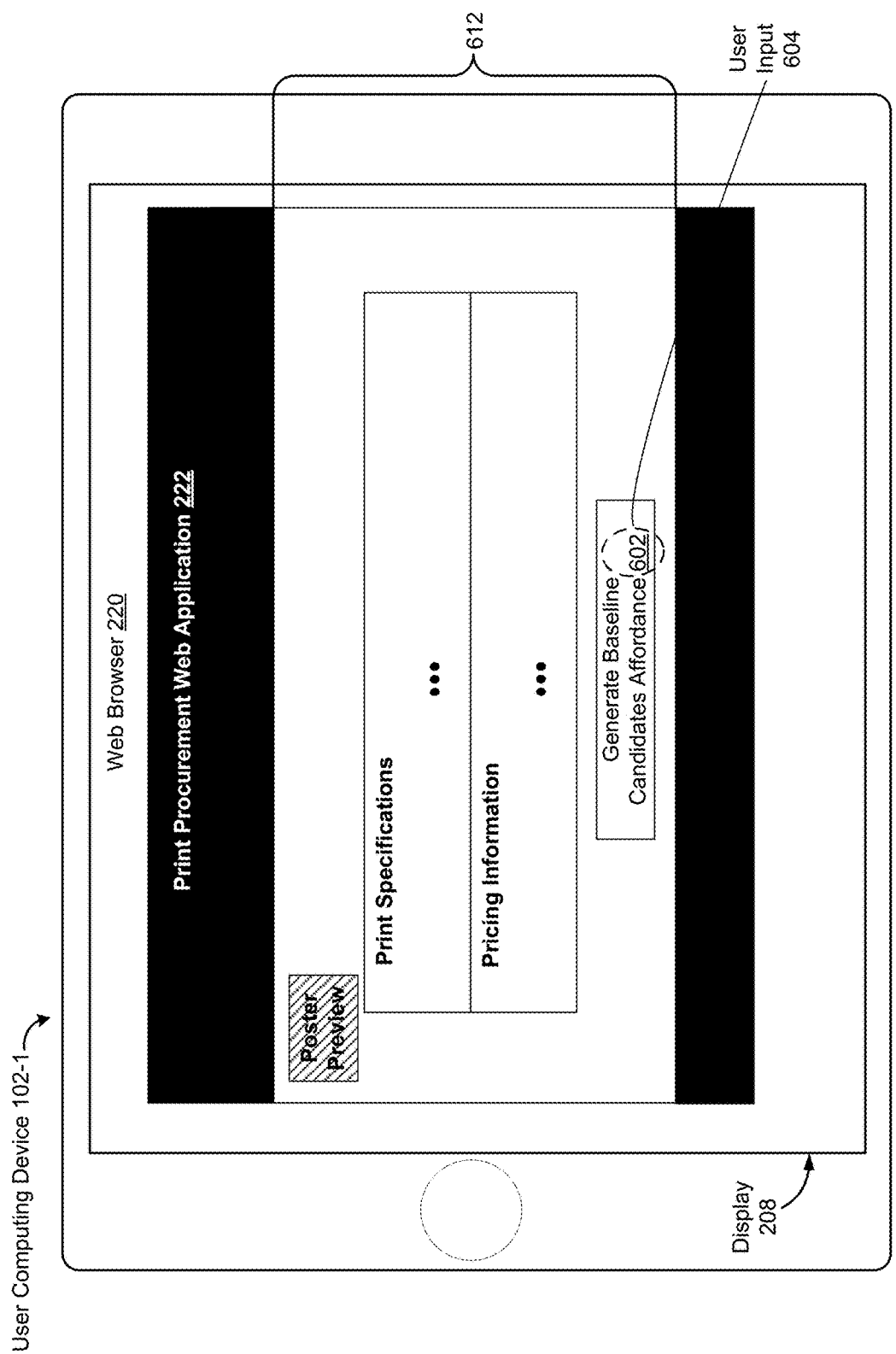
Figure 6B:
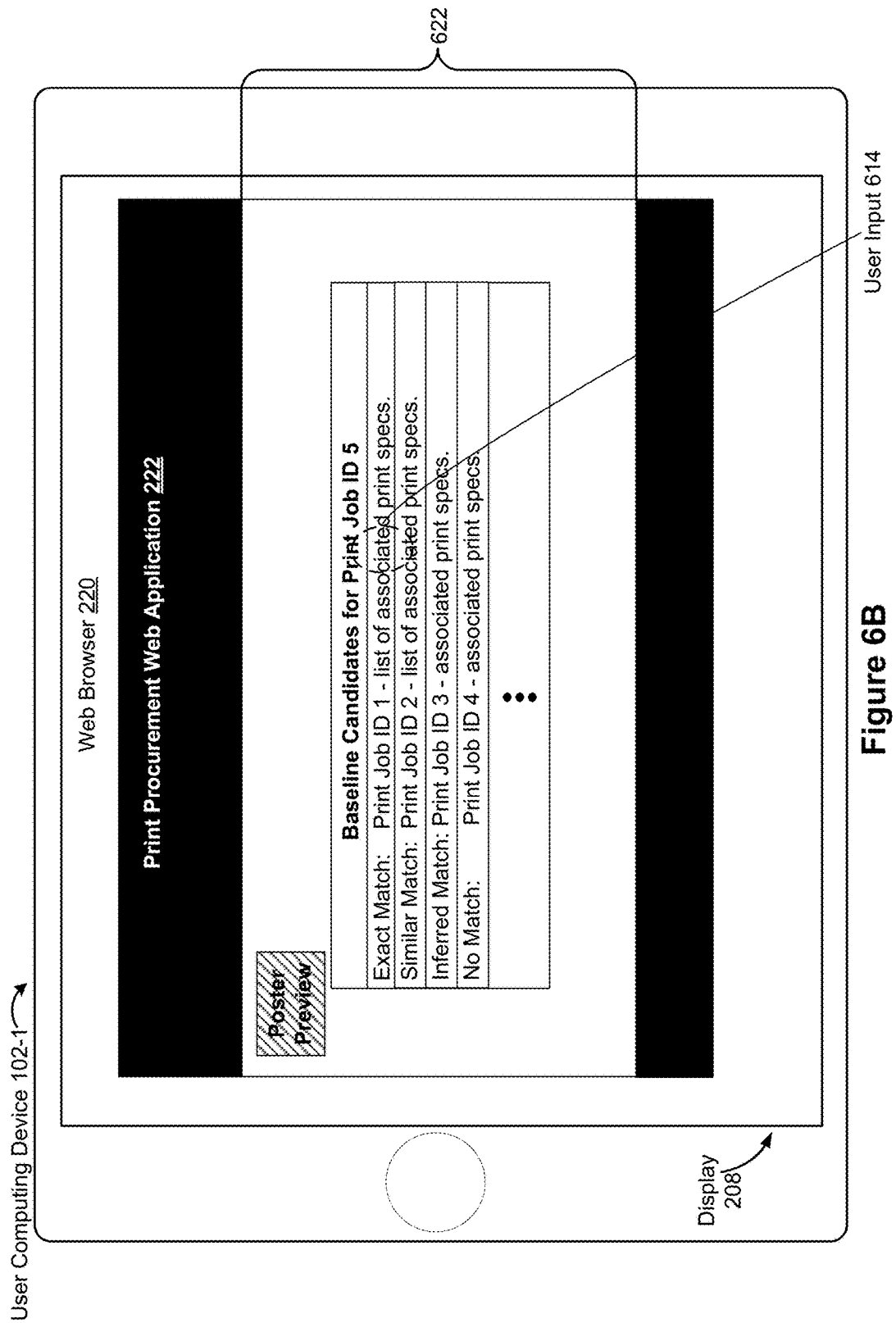
Figure 6C:
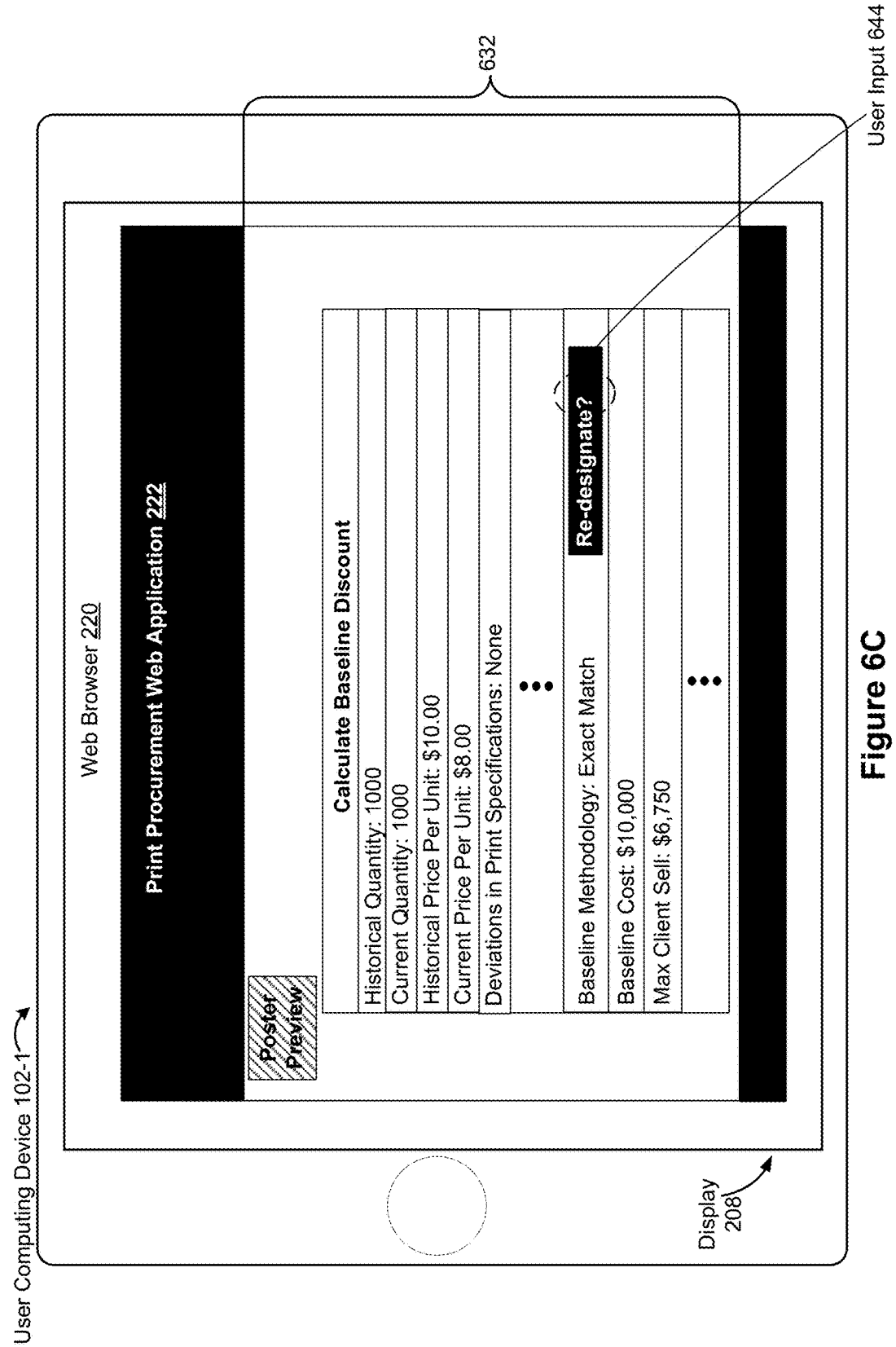
Figures 6D, 6E:
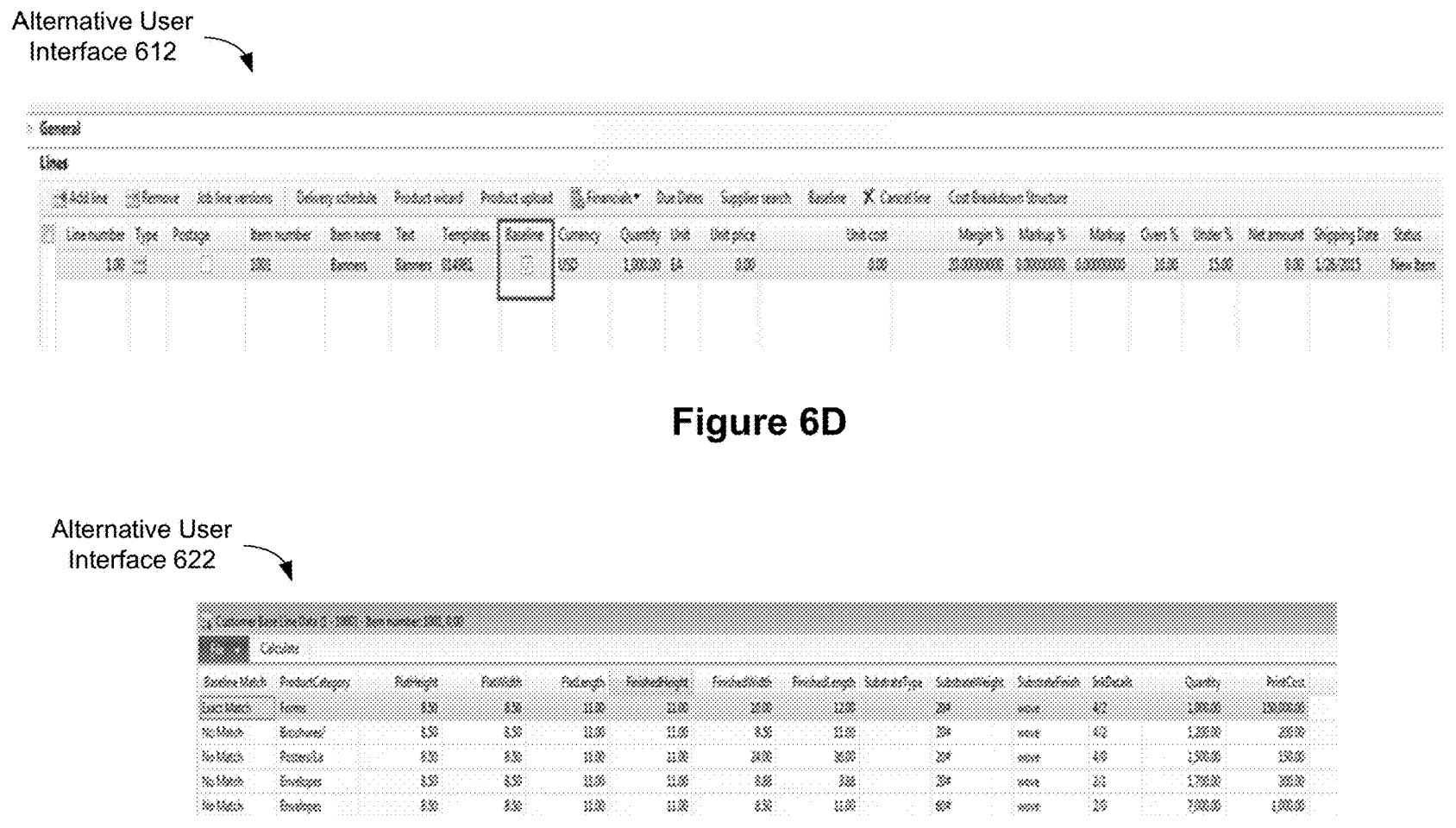
Figure 6F:
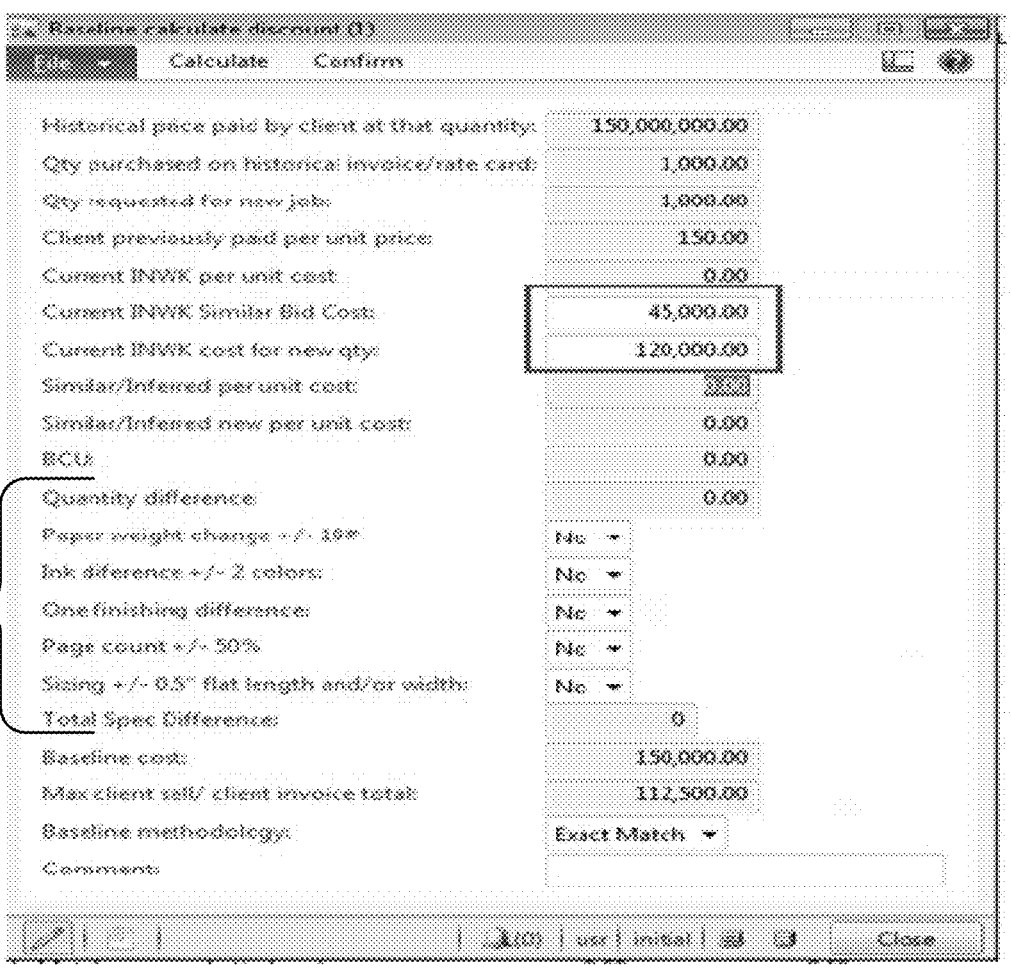

Additional exemplary deviations in print specifications (that may be used in one of the baseline match tolerances) are shown in user interface region 644 of FIG. 6F. As shown in FIG. 6F, the deviations in print specifications may include a quantity difference, a paper weight change of +/−10#, ink difference of +/−2 colors, one finishing difference, page count +/−50%, and sizing +/−0.5 inch flat length or width. In some embodiments, the exact, similar, and/or inferred match tolerances also include information about a total spec difference (also shown in user interface region 644 of FIG. 6F) that indicates a maximum number of deviations in print specifications. For example, if the similar match tolerance indicates a total spec difference of 1 and, even though a particular line item is associated with print specifications that satisfy each of the two deviations in print specifications individually, the particular line item would not be designated as a similar baseline match candidate because the particular line item differences in two print specifications which exceeds the total spec difference of 1.

As shown in FIG. 5B, the baseline match tolerance data structure 324-1 includes records 510-1, 510-2 through 510-N. As one example of the information stored in an exemplary record in the baseline match tolerance data structure 324-1, record 510-1 stores a value of "1" in the item ID field, a value of "1" in the job ID field, a value of "{no deviations}" in the exact match tolerance field, a value of "{quantity: 10%}" in the similar match tolerance field, and a value of "{quantity: 10%, paperWeight: 10#}" in the inferred match tolerance field.

Although illustrated as a particular implementation of a data structure (e.g., a table), the data structures of FIGS. 5A-5B, in some embodiments, are implemented in XML files, tables within a relational database, text files, and/or any other suitable format for storing data.

Turning now to FIGS. 6A-6F, schematics of a display are shown and are used to illustrate user interfaces for displaying and interacting with information about print jobs and for generating and displaying baseline match candidates, in accordance with some embodiments. For ease of reference, the user interfaces discussed below are described as displayed within a web browser but, in other embodiments, the user interfaces may be displayed within a locally-installed application, such as a mobile phone/device or desktop application (e.g., print procurement application 224). The user interfaces described in reference to FIGS. 6A-6C are merely exemplary and additional user interfaces for print procurement applications are also shown in FIGS. 6D-6F and in FIGS. 8A-8P (as discussed in more detail below) and may be used to perform some of the functions described with respect to the user interfaces in FIGS. 6A-6C.

As shown in FIG. 6A, a web browser (e.g., web browser 220, FIG. 2) of a user computing device (e.g., user computing device 102-1) is used to render information received from a server (e.g., one or more print procurement servers 106, FIG. 1) in order to display a print procurement web application (e.g., print procurement web application 222, FIG. 2). In some embodiments, the print procurement web application 222 displays information about print jobs that is retrieved from one or more servers 106 (FIGS. 1 and 3) and the displayed information includes user interface region 612. In some embodiments and as shown in FIG. 6A, the user interface region 612 includes details for a particular line item within a particular print job (e.g., item ID 5 of print job 4). In some embodiments, the user interface region 612 includes a preview of the item (e.g., the displayed poster preview as shown in FIG. 6A), print specifications associated with the item (e.g., the displayed print specifications are retrieved from record 410-5 of print job data structure 322-1 by querying the data structure 322-1 using item ID 5 and job ID 4), and pricing information about the item. In some embodiments, the pricing information includes default information that is not populated until baseline candidates are identified and then selected for the item (as discussed in more detail below in reference to FIGS. 8M-8N). Therefore, the user interface region 612 within the print procurement web application 222 also includes an affordance (e.g., generate baseline candidates affordance 602) that allows the client (or a PPM acting on their behalf) to initiate a process for identifying baseline candidates (e.g., to initiate the method 700 discussed below). In other embodiments, the user interface region 612 has a different visual appearance, such as that shown in alternative user interface 612 (FIG. 6D).

In some embodiments, in response to detecting user input at the displayed affordance 602 (e.g., in response to detecting user input 604, FIG. 6A), a process for generating baseline candidates is initiated. In some embodiments, in response to detecting the user input 604, the print procurement web application 222 is updated (e.g., by receiving data from one of the print procurement servers 106) to display the user interface shown in FIG. 6B. In some embodiments, the user interface shown in FIG. 6B displays information about baseline candidates for the line item (e.g., item ID 5 and job ID 4, "Summer 2015 Poster") in a user interface region 622. In some embodiments, the user interface region 622 includes the poster preview discussed above and additionally includes a list of designated baseline candidates for the line item. As discussed below, a historical line item (i.e., a historical line item is one that is a part of a completed/fulfilled print job) can be designated as either exact, baseline, inferred, or no baseline match, in accordance with a comparison of print specifications associated with the historical line item to print specifications associated with the line item (discussed in more detail below in reference to FIGS. 7A-7B). In other embodiments, the user interface region 622 has a different visual appearance, such as that shown in alternative user interface 622 (FIG. 6E).

In some embodiments, each baseline candidate within the displayed list of designated baseline candidates is selectable. In response to detecting a selection of a respective baseline candidate (e.g., in response to detecting user input 614), the print procurement web application 222 is updated (e.g., by receiving data from one of the print procurement servers 106) to display the user interface shown in FIG. 6C. For example, the user interface shown in FIG. 6C is a baseline calculator that allows the client (or a PPM acting on their behalf) to determine a baseline price based on historical purchasing information associated with the selected baseline candidate. In some embodiments, the baseline calculator also includes a "re-designate?" button/affordance that, when selected, causes the print procurement web application 222 to re-designate the selected baseline candidate as a different type of baseline match (e.g., change an exact baseline match to an inferred or a similar baseline match). In some embodiments, in response to receiving a selection of the re-designate affordance (e.g., user input 644, FIG. 6C), the print procurement web application 222 is updated to display a user interface element (e.g., a dialog box) that allows for re-designating the selected baseline candidate as a different type of baseline match. After receiving re-designation information at the user interface element (e.g., user input indicating that the selected baseline match should be re-designated as a similar baseline match), the print procurement system determines whether baseline match tolerances associated with the line item should be modified.

In some embodiments, determining whether baseline match tolerances associated with the line item should be modified includes analyzing print specifications associated with the selected baseline candidate and determining whether additional differences in print specifications are present (i.e., differences between print specifications for the line item and those for the selected baseline candidate, distinct from deviations that are already included in the baseline match tolerances) and/or whether one or more deviations specified in the baseline match tolerances should be revised. In accordance with a determination that additional differences in print specifications are present, the system suggests modifying the baseline match tolerances to account for the additional differences. For example, the system updates web application 222 to present an additional user interface that describes the additional differences and allows the client (or a PPM acting on their behalf) to modify the baseline match tolerances.

Alternatively or in addition to the determination of additional differences, in accordance with a determination that one or more deviations specified in the baseline match tolerances should be revised, the system updates web application 222 to present an additional user interface that includes information about suggested revisions to the one or more deviations. As an example, if the selected baseline candidate had a deviation of 6% in quantity (relative to print specifications associated with the line item) and thus satisfied a similar match tolerance of up to a 10% deviation in quantity, but the client (or the PPM acting on its behalf) re-designated the selected baseline candidate as an inferred baseline match, then the system can propose modifying the similar baseline match threshold to have a lower percentage of acceptable deviations in quantity. In some embodiments, the print procurement system monitors re-designations for each client and proposes modifications to one or more baseline match tolerances for that client after a threshold number of re-designations have occurred (e.g., after three or more). In some embodiments, the threshold number of re-designations is different depending on the type of re-designation (e.g., exact to similar, exact to inferred, similar to inferred, etc.). For example, any re-designation that changes an exact or a similar baseline match to an inferred baseline match may immediately trigger a change to the inferred baseline match tolerances, but the exact or similar baseline match tolerances remain unaffected.

In some embodiments, the baseline calculator is displayed within a user interface region 632 on the display 208. In other embodiments, the baseline calculator is displayed within an alternative user interface, such as alternative user interface 632 (FIG. 6F) or the user interfaces shown in FIGS. 8L-8N.

Figure 8A:
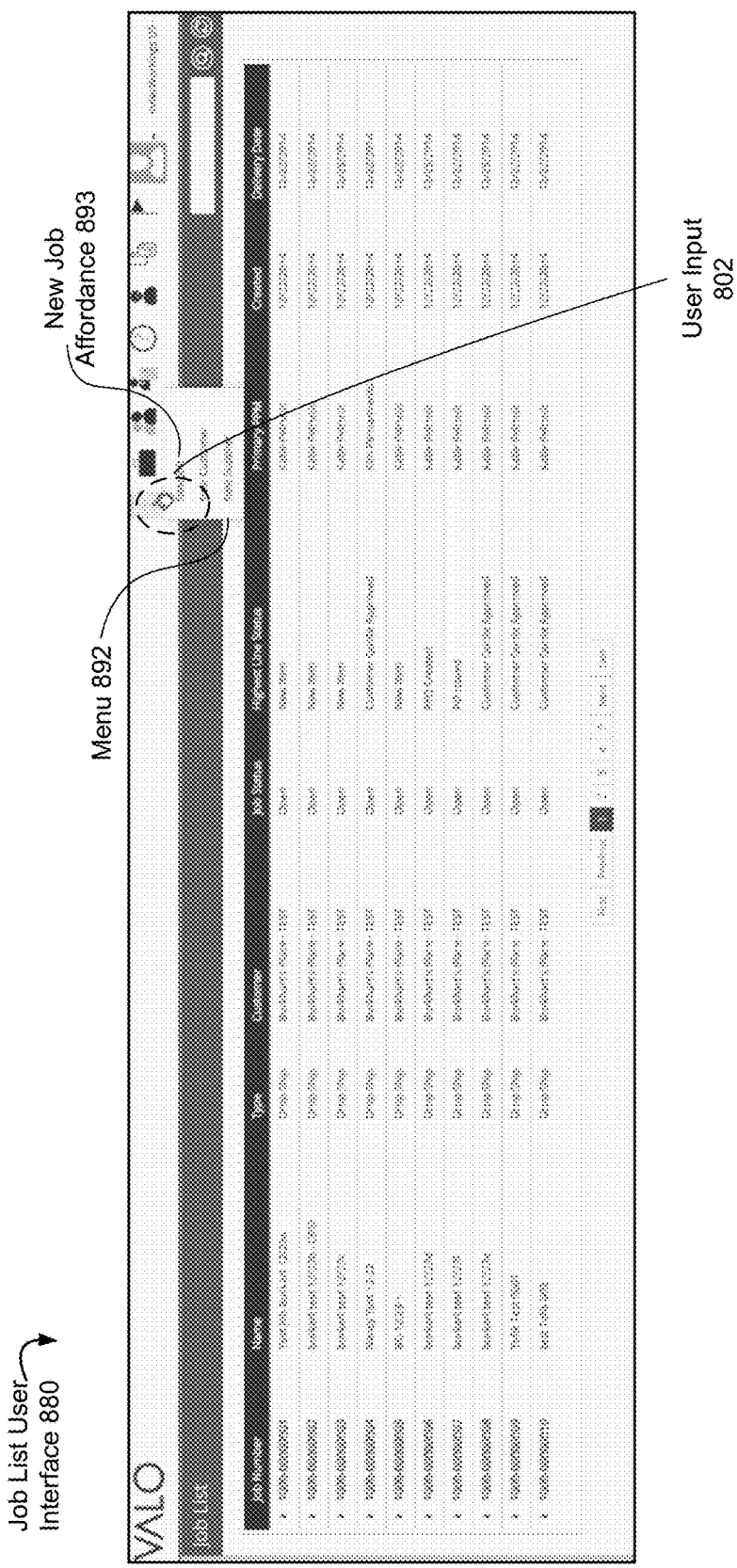
FIGS. 8A-8P are schematics of a display used to illustrate exemplary user interfaces for a method of generating baseline candidates in a print procurement systems, in accordance with some embodiments.
Figure 8B:
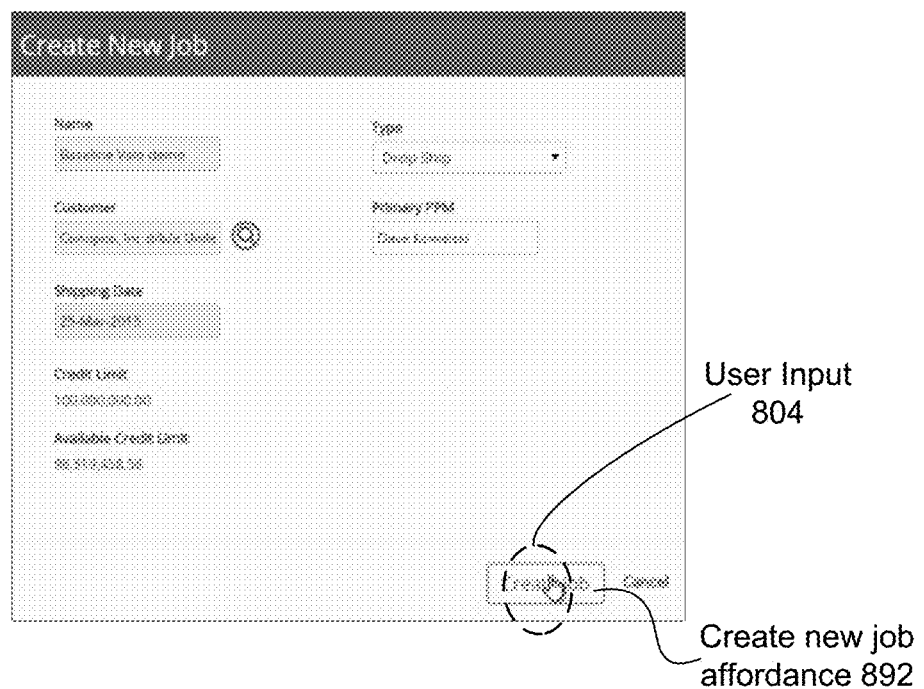
Figure 8C:
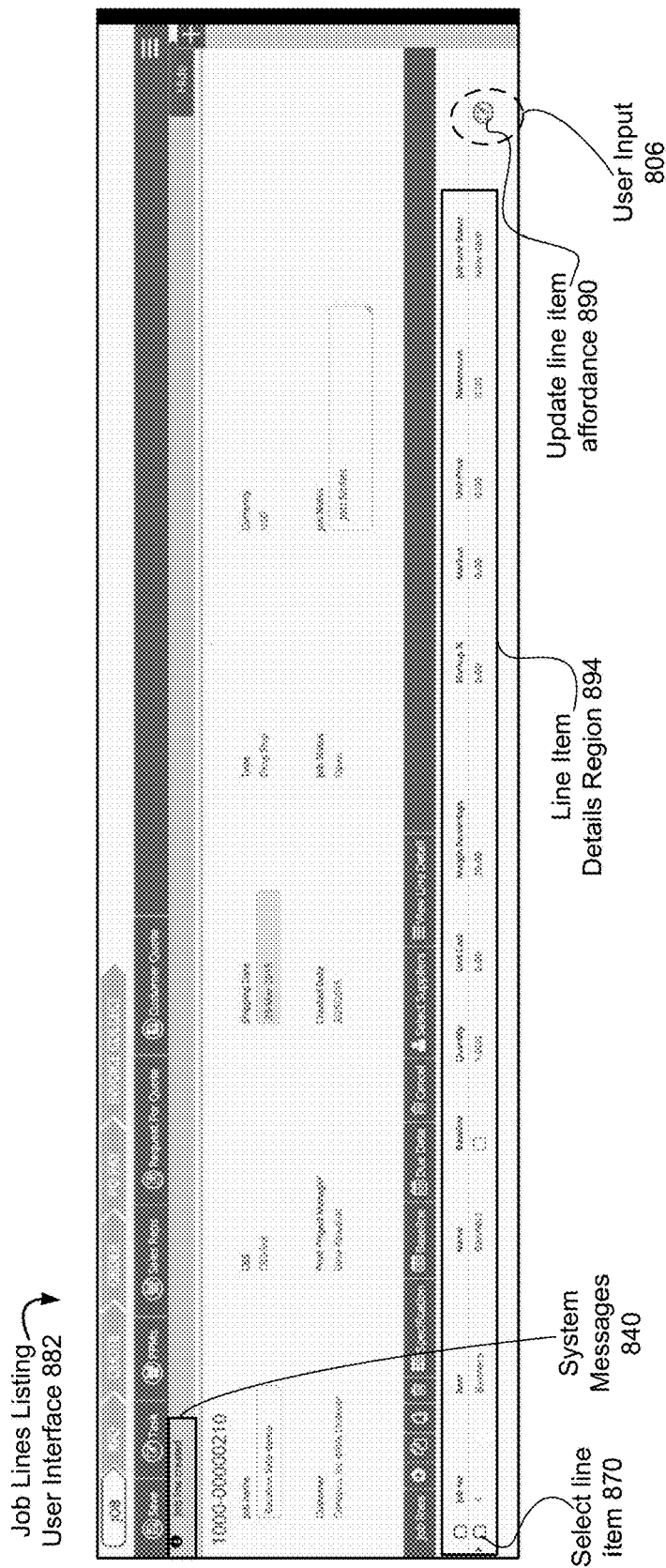
Figure 8D:
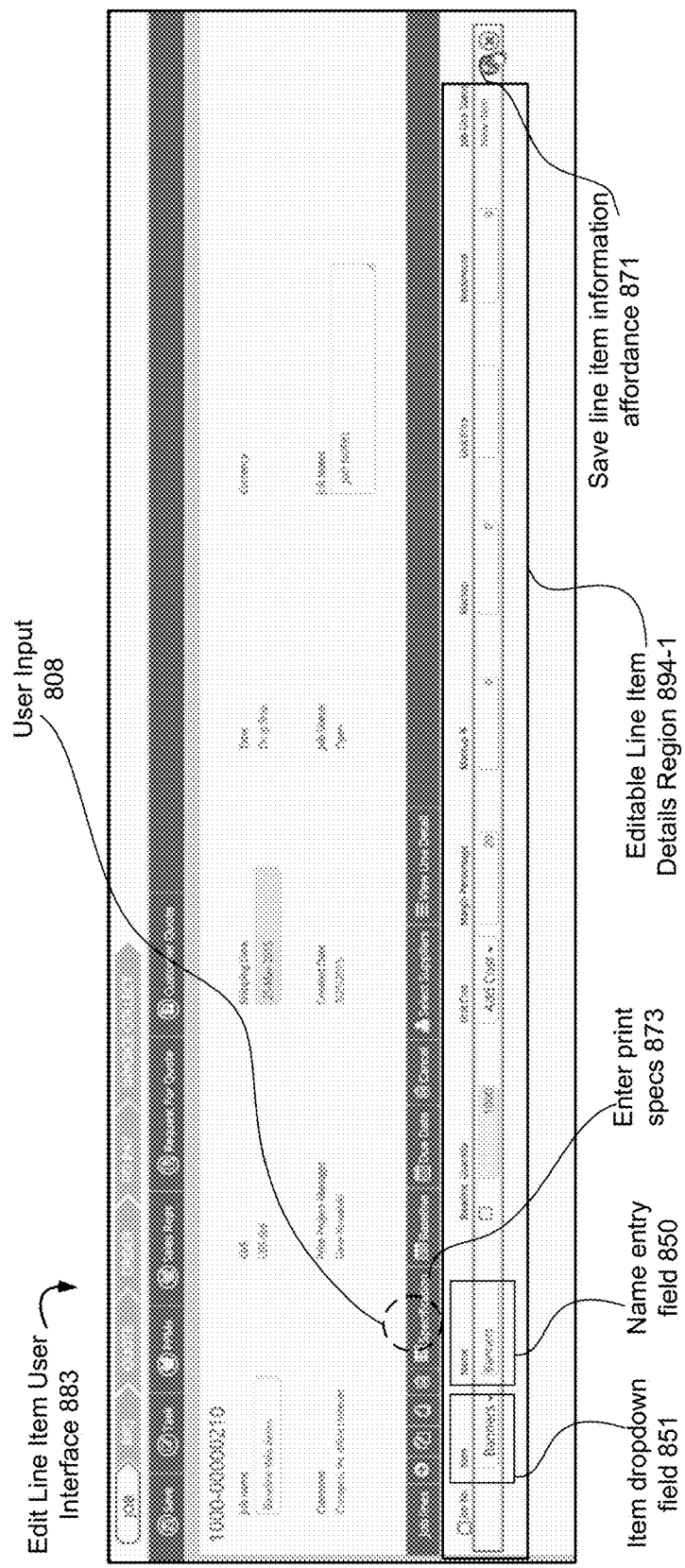
Figure 8E:
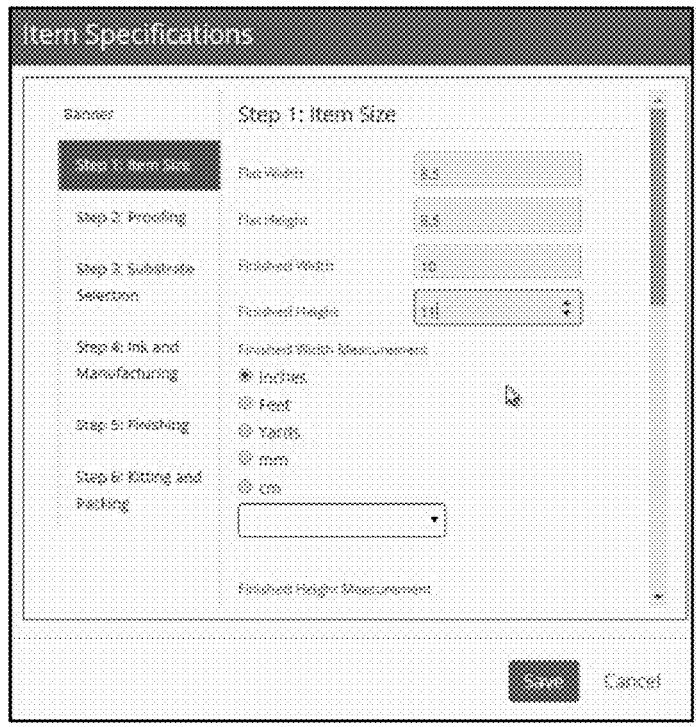
Figure 8F:
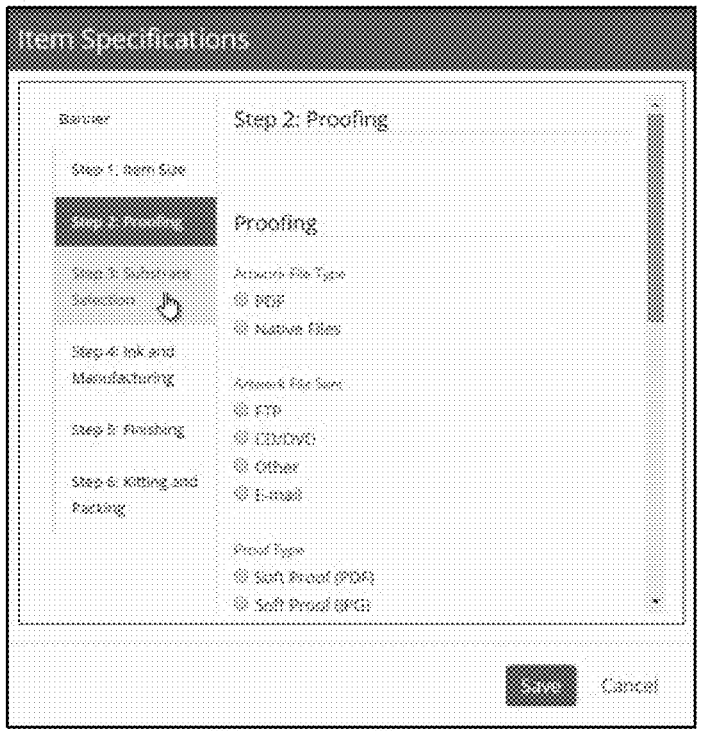
Figure 8G:
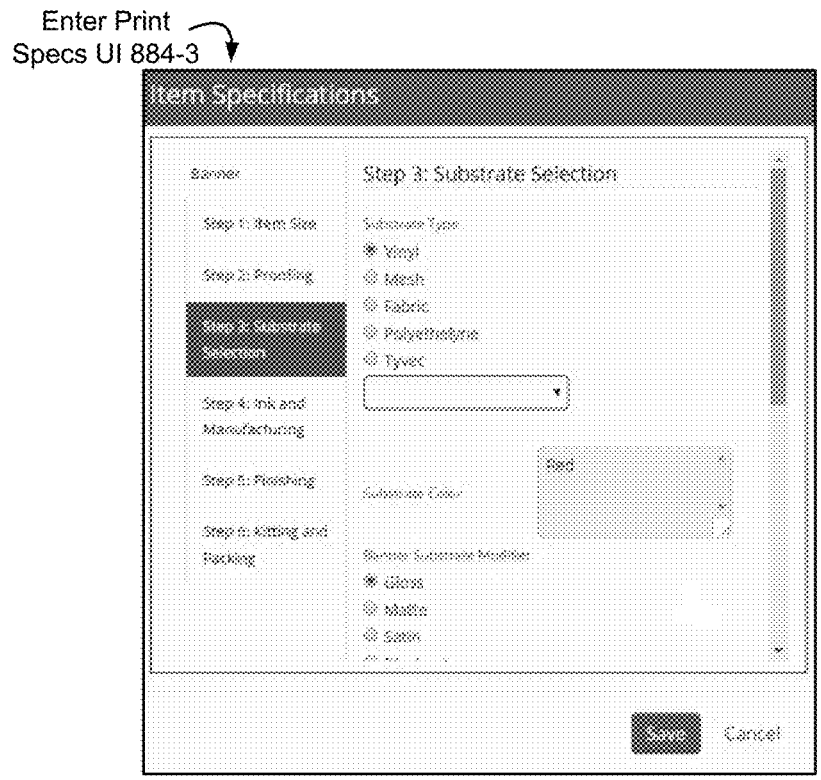
Figure 8H:
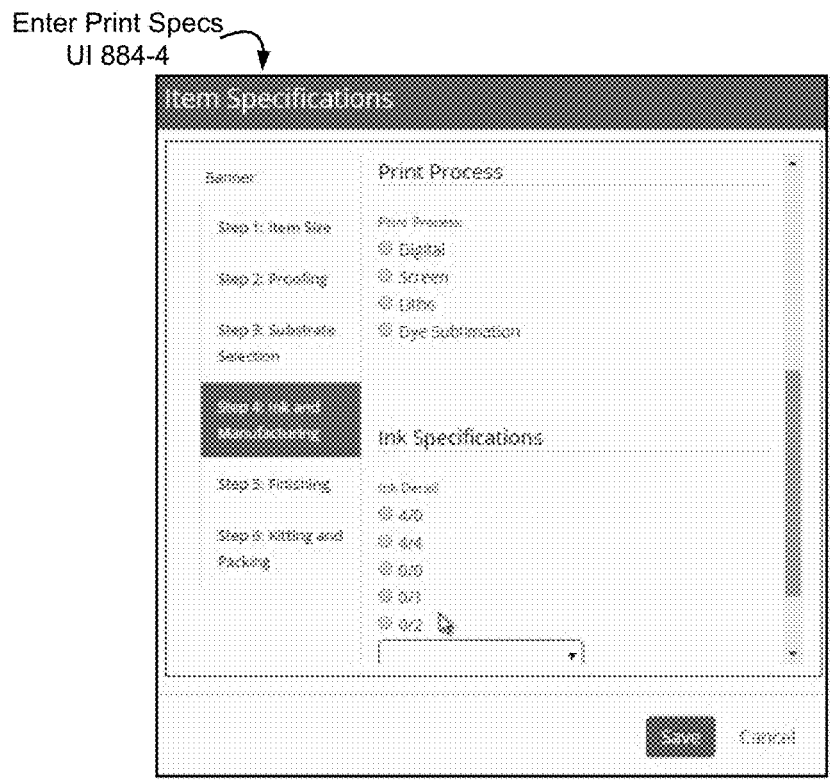
Figure 8I:
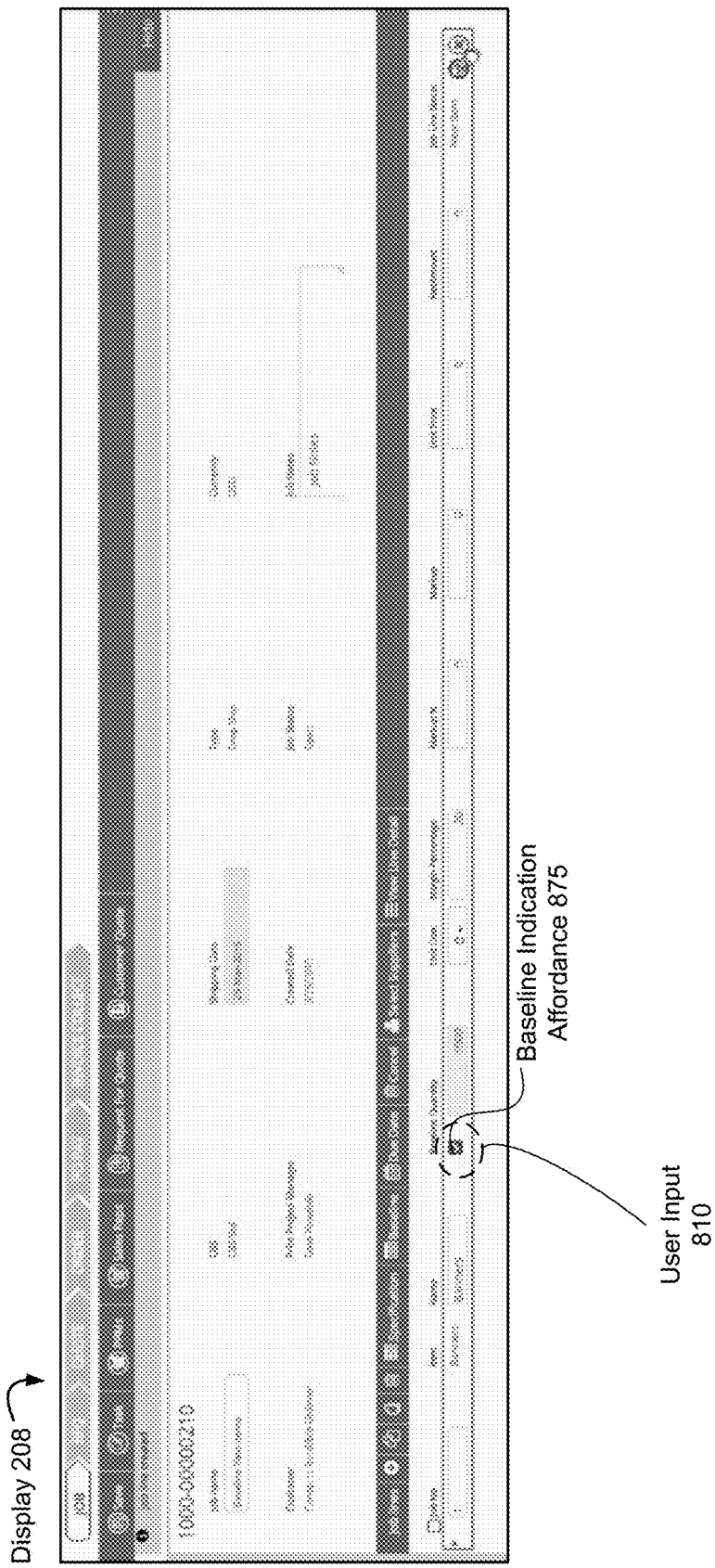
Figure 8J:
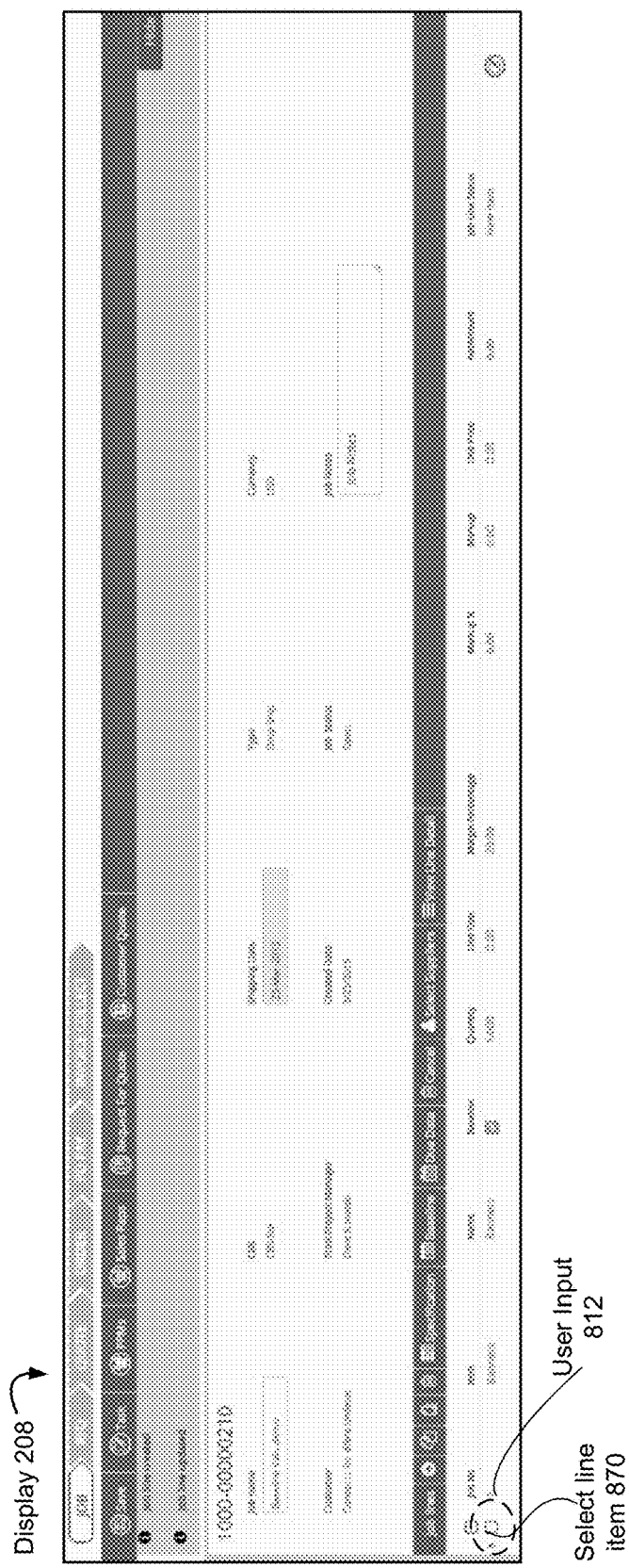
Figure 8K:
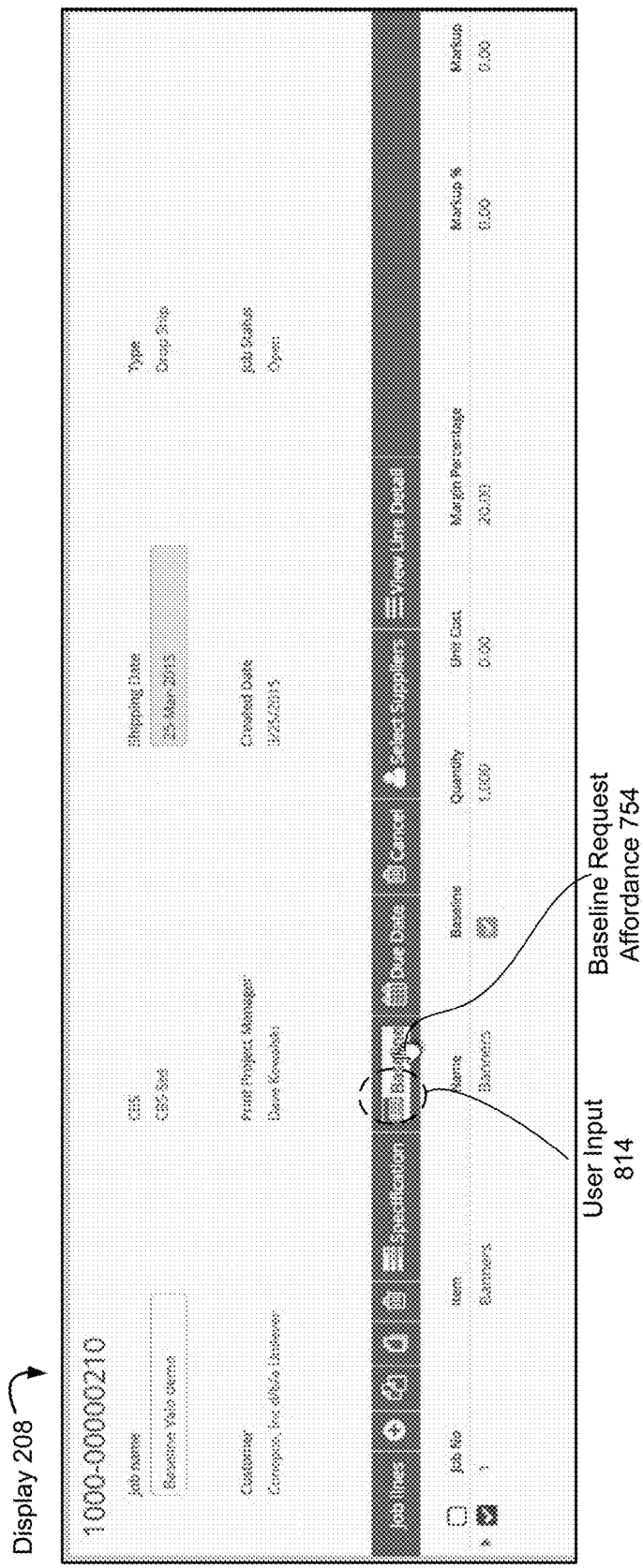
Figure 8L:
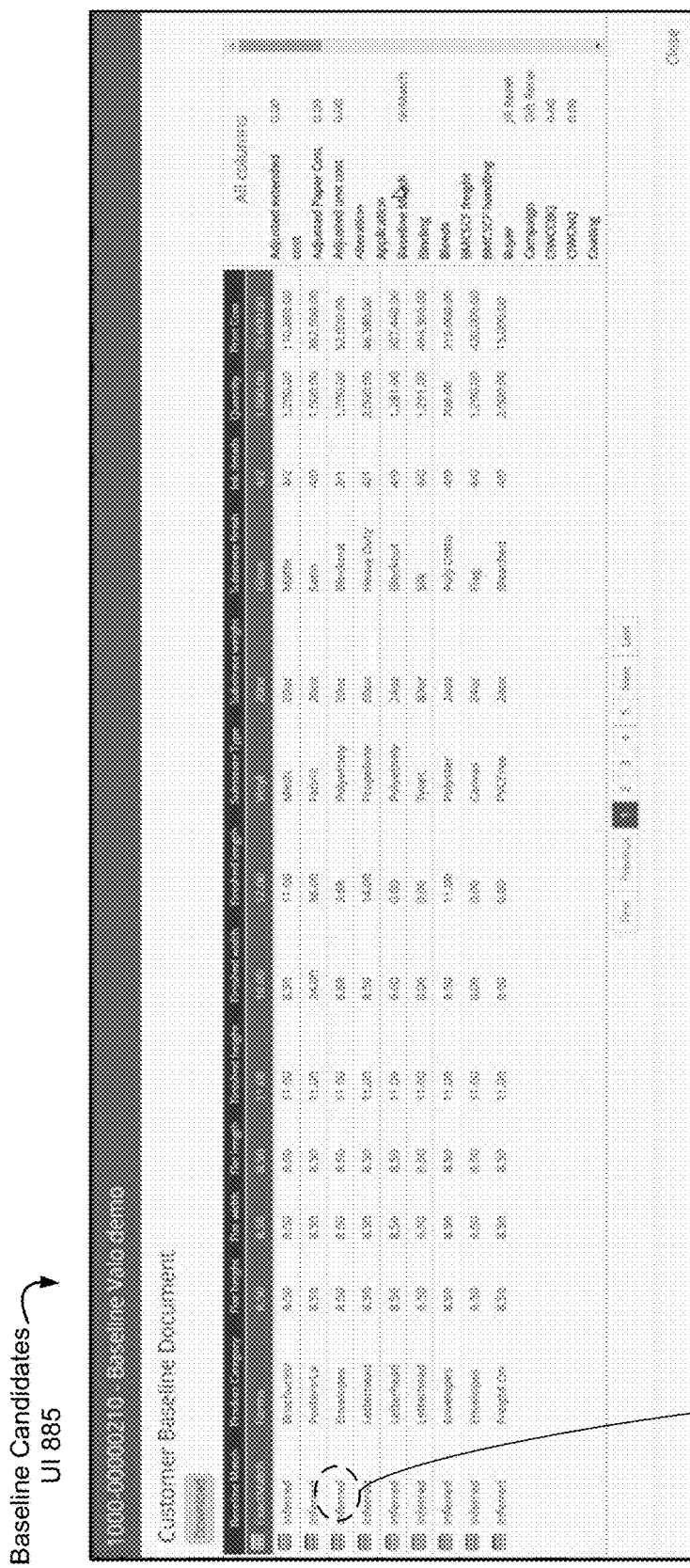
Figure 8M:
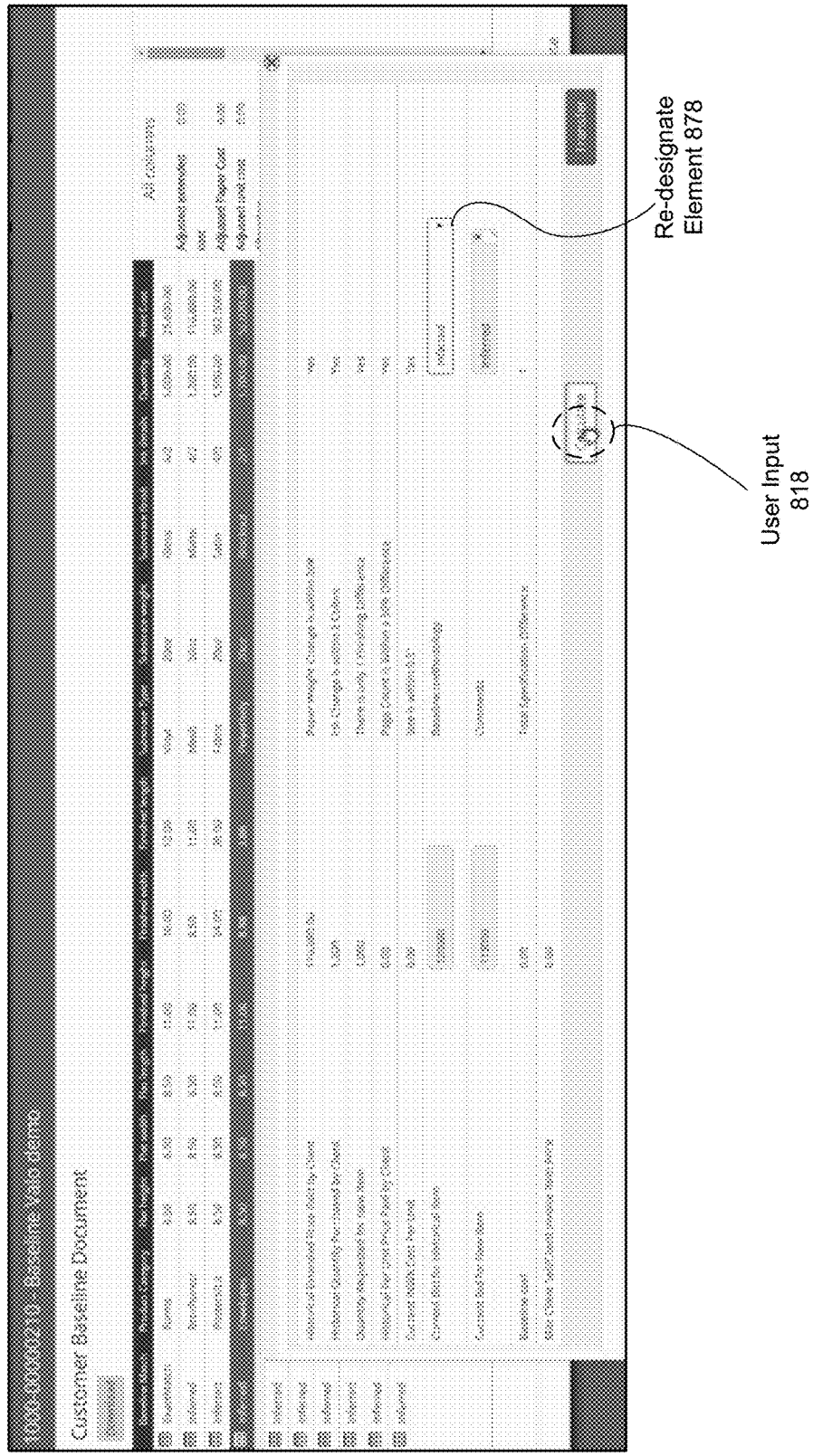
Figure 8N:
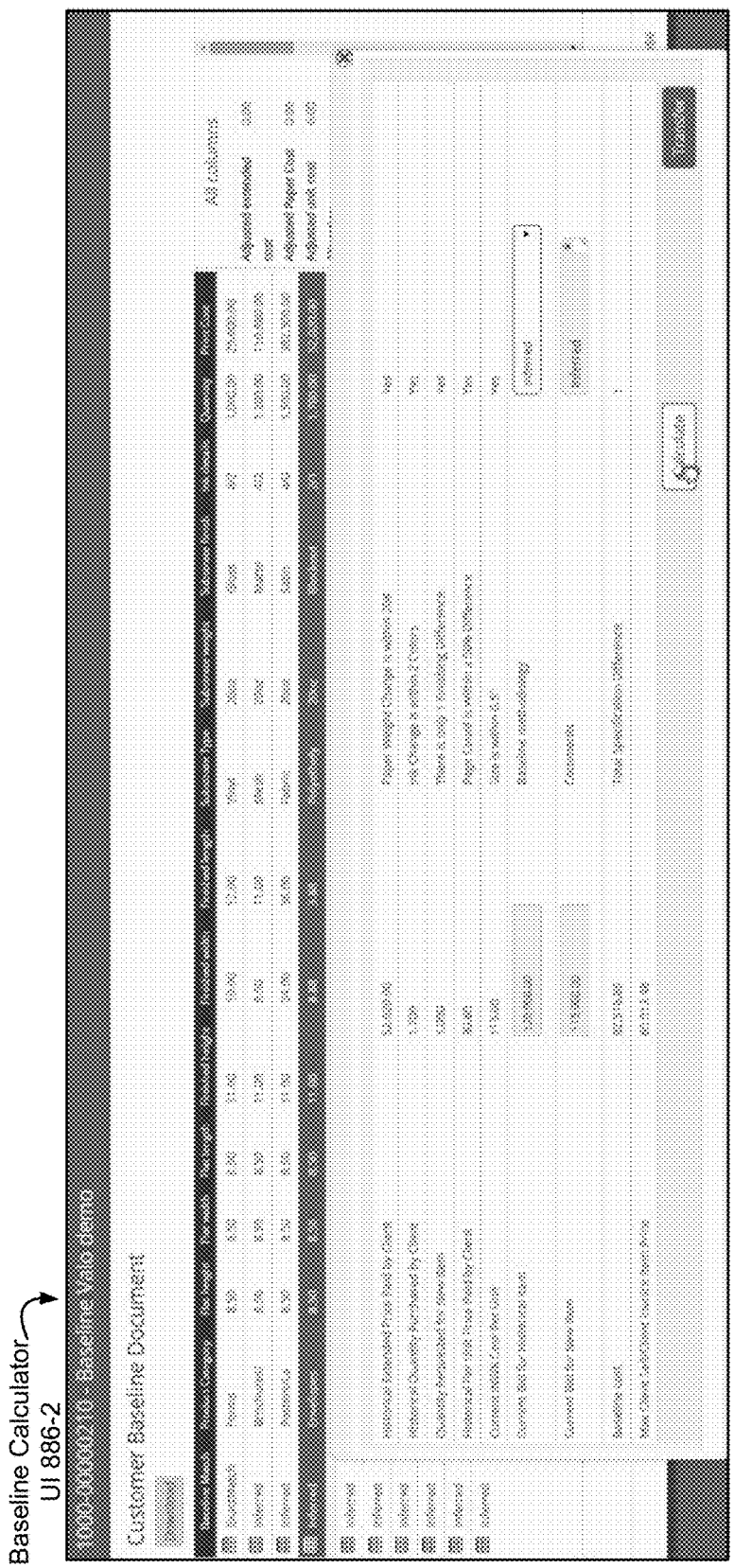
Figure 8O:
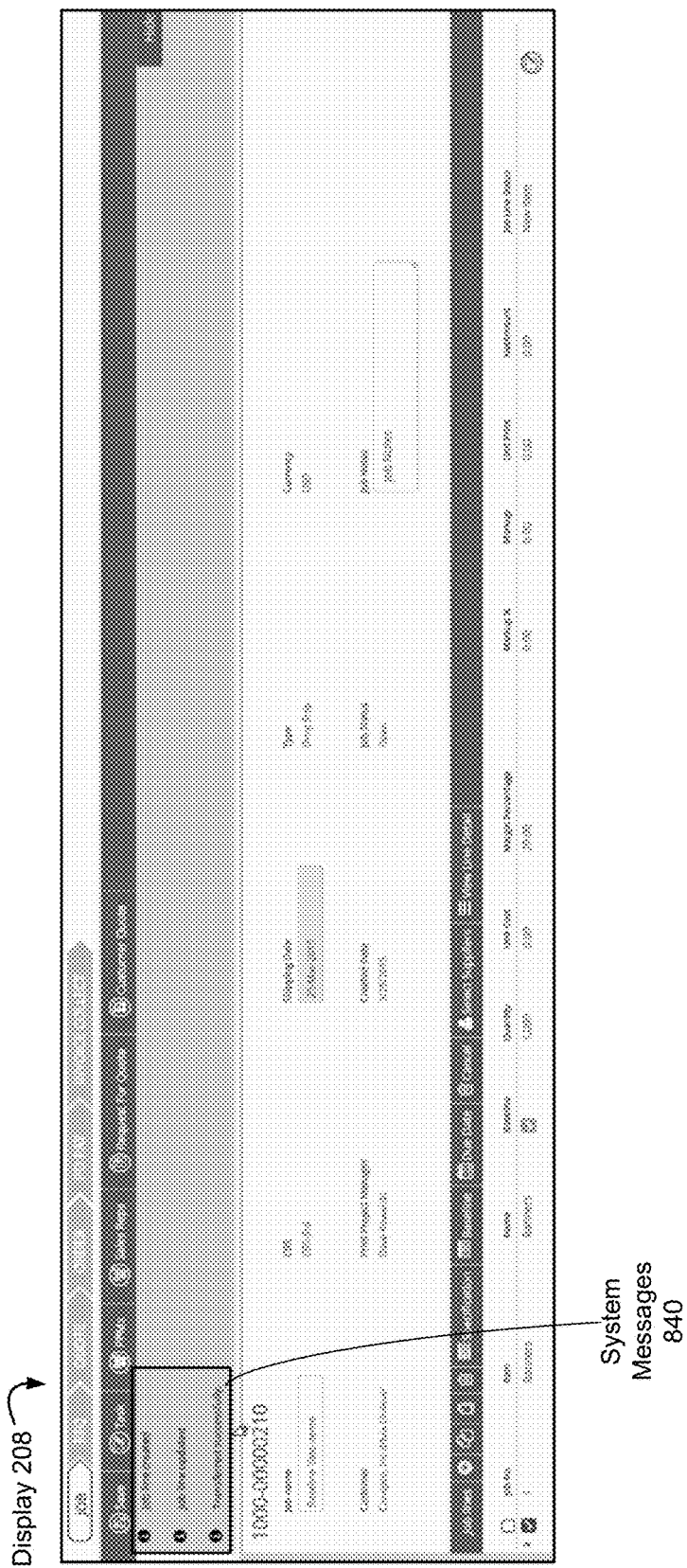
Figure 8P:

In some embodiments, the visual characteristics of the user interfaces shown in FIGS. 6A-6F include one or more visual characteristics of the user interfaces shown in FIGS. 8A-8P.

Figure 7A:
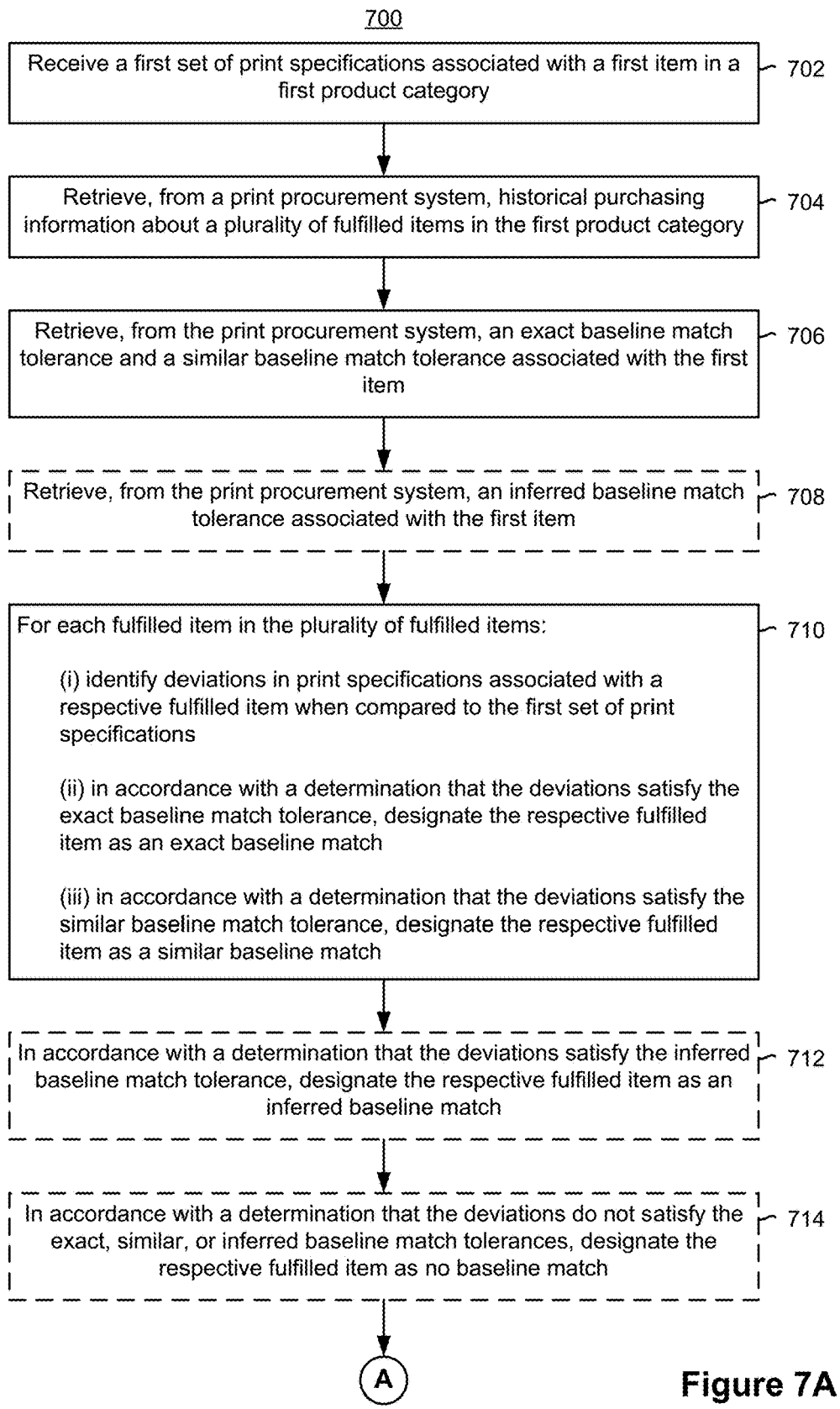
FIGS. 7A-7B are a flowchart representation of a method of generating baseline candidates in a print procurement system, in accordance with some embodiments.
Figure 7B:
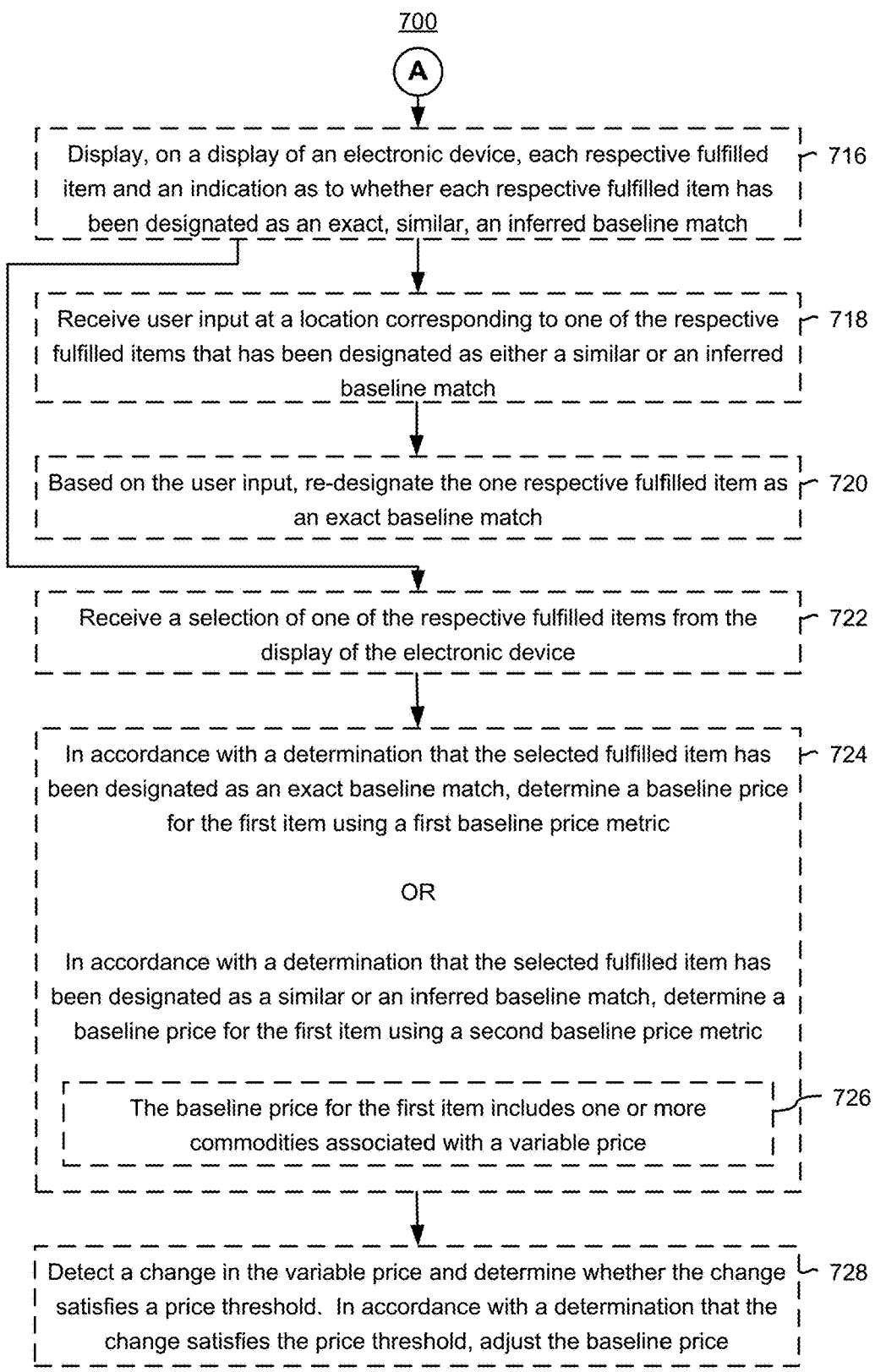

FIG. 7 is a flowchart depicting a method 700 of generating baseline match candidates in a print procurement system, in accordance with some embodiments. FIGS. 8A-8P are used to illustrate the methods and/or processes of FIGS. 7A-7B. In some embodiments, each of the user interfaces presented in FIGS. 8A-8P are presented on a display of a computing device (e.g., display 208 of user computing device 102-1, as pictured for the user interfaces shown in FIGS. 6A-6C). Although some of the examples which follow will be given with reference to inputs on a touch-sensitive display (e.g., of a mobile phone or a tablet device, in which a touch-sensitive surface and a display are combined), in some embodiments, the device detects inputs on a touch-sensitive surface that is separate from the display 208 (e.g., a desktop or a laptop computing device).

In some embodiments, the method 700 is performed by an electronic device (e.g., computing device 102-1, FIG. 2) and/or one or more components of the electronic device. In some embodiments, the method 700 is governed by instructions that are stored in a non-transitory computer-readable storage medium and that are executed by one or more processors of a device, such as the one or more processors 202 of device 102-1 (FIG. 2). For ease of explanation, the following describes method 700 as performed by the device 102-1. In some embodiments, with reference to FIG. 2, the operations of method 700 are performed by or use, at least in part, a web browser (e.g., web browser 220), a print procurement web application (e.g., print procurement web application 222), a print procurement application (e.g., print procurement application 224), a baseline candidate designation module (e.g., baseline candidate designation module 226), a print job data fetching module (e.g., print job data fetching module 228), and/or a display (e.g., display 208). Some operations in method 700 are, optionally, combined and/or the order of some operations is, optionally, changed.

As described below, the method 700 provides a fast, intuitive, easy-to-use, and robust way to identify and designate baseline match candidates in a print procurement system. The method reduces the new learning required of a user of a print procurement system when selecting baseline candidates, thereby creating a more effective and efficient human-machine interface. Furthermore, generating baseline match candidates using multiple baseline methodologies in print procurement systems allows users to create more sophisticated and accurate baseline calculations. Further, the techniques described with regard to FIGS. 7A-7B provide enhanced flexibility for identifying baseline candidates and allow determination of a greater number of potential baseline candidates.

Referring now to FIG. 7A, a print procurement application (e.g., executing locally on a computing device 102 or executing through a client-server or web-based architecture by sending information between the computing device and a server 106) receives (702) a first set of print specifications associated with a first item in a first product category. In some embodiments, the first set of print specifications includes, e.g., quantity, finished size, flat size, paper weight, paper type, print colors, coating information, basic finishing information, complex finishing information, packing information, delivery information, proofing information, substrate selection information, ink information, and/or kitting information. In some embodiments, product categories include, e.g., banners, posters, and/or business cards.

In some embodiments, the first set of print specifications is received when a client (or a PPM acting on the client's behalf) enters the first set of print specifications into a print procurement application. In some embodiments, before entering the first set of print specifications, the PPM first creates a print job using the print procurement application (e.g., print procurement application 224 or print procurement web application 222 through a web browser 220). For ease of reference, references to the print procurement application (or simply the application) refer to either the print procurement application or the print procurement web application, unless explicitly noted otherwise. In some embodiments, creating a print job and entering the first set of print specifications includes interacting with a sequence of user interfaces that allow the PPM to create a new job and enter the print specifications, such as the sequence of user interfaces presented in FIGS. 8A-8H.

For example, the PPM accesses a job list user interface (e.g., job list user interface 880, FIG. 8A) within the print procurement application and selects an affordance for creating a new print job (e.g., by providing user input 802 (e.g., a mouse click or a tap/contact using a finger) at a print job creation affordance within the job list user interface 880). In some embodiments, the user input 802 includes a first user input at a menu (e.g., menu 892, FIG. 8A) and a second user input at a new job affordance within the menu (e.g., new job affordance 893, FIG. 8A). In response to detecting the user input 802, the print procurement application is updated to display a create new job user interface (e.g., create new job user interface 881) on the display 208. In some embodiments, the create new job user interface 881 overlays the job list user interface 880, such that the content within the job list user interface 880 is visible beneath the create new job user interface 881. Within the create new job user interface, the PPM enters details related to the new print job (e.g., details such as a name, a type, a customer name, a primary PPM, a shipping date, a credit limit, and an available credit limit). In some embodiments, one or more of the details related to the new print job are auto-populated (i.e., populated without receiving any user input) based on stored information associated with the PPM (e.g., the primary PPM is auto-populated based on the currently-logged-in user and/or the credit limit and available credit are auto-populated based on information associated with the selected customer).

In some embodiments, the create new job user interface 881 includes a create new job affordance (e.g., create new job affordance 892) that, when selected, causes the print procurement application to create a new print job with the details related to the new print job. In response to detecting user input at the create job affordance (e.g., user input 804), the print procurement application creates one or more records associated with the new print job and stores them in a database (e.g., print job databases 108, discussed above in reference to FIGS. 1, 3, 4A-4B, and 5A-5B). Additionally, in response to detecting the user input at the create job affordance 892, the print procurement application is updated to display information about the new print job. For example, in some embodiments, the print procurement application is updated to display a job lines listing user interface (e.g., job lines listing user interface 882) that includes information about each line item associated with the new print job.

In some embodiments, the information about each line item associated with the new print job is displayed in a line item details region (e.g., line item details region 894, FIG. 8C). In some embodiments, the job lines listing user interface 882 also includes a system messages region. In some embodiments, system messages 840 displays messages about systems events (e.g., as shown in FIG. 8C, the systems messages region 840 includes an indication that a new job line has been created). In some embodiments, the job lines listing user interface 882 also includes an update line item affordance (e.g., update line item affordance 890) and, in response to detecting user input at the update line item affordance (e.g., user input 806), the print procurement application displays an edit line item user interface (e.g., edit line item user interface 883) that allows the PPM to modify or update information associated with one or more line items (e.g., the banner line item that is shown within the edit line item user interface 883 in FIG. 8D) that are associated with the currently-displayed print job (e.g., the print job created using the user interfaces discussed above in reference to FIGS. 8A-8B). In some embodiments, selecting the updated line item affordance causes the print procurement application to convert the information in the line item details region 894 from a read-only state to an editable state. For example, as shown in FIG. 8D, the line item details region 894 displays editable information associated with the selected line item (e.g., editable line item details region 894-1). In some embodiments, the edit line item user interface 883 also includes a save line item information affordance 871 that, when selected, causes the print procurement application to save any information in the editable line item details region 894-1 that has been updated, modified, or added.

In some embodiments, the PPM selects a line item while on the job lines listing user interface 882 or the edit line item user interface 883 (e.g., by clicking on or tapping a select line item 870 checkbox, FIG. 8C). In some embodiments, after selecting a line item in response to detecting user input at an affordance for entering print specifications (e.g., user input 808 at enter print specs 873), the print procurement application is updated to display user interfaces that allow for the entry of print specifications associated with the selected line item (e.g., enter print specifications user interfaces 884-1 through 884-4, as shown in FIGS. 8E-8H). In some embodiments, the enter print specifications user interface 884-1 allows the PPM to enter print specifications related to item size, such as flat width, flat height, finished width, finished height, finished width measurements, finished height measurements, and the like (FIG. 8E). In some embodiments, the enter print specifications user interface 884-2 allows the PPM to enter print specifications related to proofing, such as an artwork file type, artwork file sent, proof type, and the like (FIG. 8F). In some embodiments, the enter print specifications user interface 884-3 allows the PPM to enter print specifications related to substrate selection, such as a substrate type, substrate color, banner substrate modifier, and the like (FIG. 8G). In some embodiments, the enter print specifications user interface 884-4 allows the PPM to enter print specifications related to the printing process, such as a print process type, ink specifications, and the like. In some embodiments, additional enter print specification user interfaces 884 are also available, in order to allow the PPM to enter finishing information and kitting and packing information (as shown in FIGS. 8E-8H). In some embodiments, selecting the save button displayed within any of the enter print specifications user interfaces 884 causes the print procurement application to update a record associated with the line item, so that the print specifications are stored for future use and reference (e.g., in a print specifications field of a respective record in a print job data structure 322, FIGS. 4A-4B).

Returning to FIG. 7A, the print procurement application retrieves (704), from a print procurement system, historical purchasing information about a plurality of fulfilled items in the first product category. In some embodiments, the print procurement system is print procurement system 100 and the print procurement application retrieves the historical purchasing information from user computing device 102 and from the servers 106 (or print job databases stored thereon). A fulfilled item is a line item within a print job for which printing work has been completed and, thus, historical purchasing information is available about the line item (i.e., information regarding per unit pricing for the line item). In some embodiments, the historical purchasing information is retrieved by querying the one or more print job databases 108 for fulfilled items in the first product category (e.g., by sending a query that specifies fulfilled=Yes and item type=Poster).

In some embodiments, retrieving the historical purchasing information about the plurality of fulfilled items in the first product category includes retrieving corresponding invoice data associated with the plurality of fulfilled items in the first product category. Consistent with these embodiments, the print procurement application discards historical purchasing information about a respective fulfilled item of the plurality of fulfilled items in accordance with a determination that the historical purchasing information does not match the corresponding invoice data associated with the respective fulfilled item of the plurality of fulfilled items. For example, in accordance with a determination that historical purchasing information about the respective fulfilled item (e.g., the historical purchase information indicates a price per unit of $10) does not match corresponding invoice data associated with the respective fulfilled item (e.g., the corresponding invoice data indicates a print per unit of $12). In this way, the print procurement application is able to eliminate potentially erroneous or untrustworthy data and produce more accurate baselines.

In some embodiments, the print procurement application retrieves (706), from the print procurement system, an exact baseline match tolerance and a similar baseline match tolerance associated with the first item. Optionally, the print procurement application also retrieves (708) an inferred baseline match tolerance. In some embodiments, the baseline match tolerances are retrieved from a baseline match tolerance data structure by querying for baseline match tolerances associated with the first item (e.g., by querying a baseline match tolerance data structure 324 for records associated with the item ID for the first item and retrieving the tolerances from the returned records, FIGS. 5A-5B provide more details regarding baseline match tolerance data structures and the information stored therein). In some embodiments, the exact baseline match tolerance specifies a first plurality of deviations from the first set of print specifications, the similar baseline match tolerance specifies a second plurality of deviations from the first set of print specifications, and the inferred baseline match threshold specifies a third plurality of deviations from the first set of print specifications. Additionally, in some embodiments, the third plurality of deviations includes more deviations than the first plurality and the second plurality of deviations and the second plurality of deviations includes more deviations than the first plurality of deviations. Exemplary deviations and baseline match thresholds are provided above in reference to FIGS. 5A-5B.

For each fulfilled item in the plurality of fulfilled items (710), the print procurement application (i) identifies deviations in print specifications associated with a respective fulfilled item when compared to the first set of print specifications, (ii) in accordance with a determination that the deviations satisfy the exact baseline match tolerance, designates the respective fulfilled item as an exact baseline match, and (iii) in accordance with a determination that the deviations satisfy the similar baseline match tolerance, designates the respective fulfilled item as a similar baseline match. As an example, the exact baseline match tolerance specifies that quantity can deviate by up to 2% (e.g., record 510-2, FIG. 5B), the similar baseline match tolerance specifies that quantity can deviated by up to 5% and finished size can deviate by up to 1% (e.g., record 510-2, FIG. 5B), and the deviations in print specifications include a deviation of 3% in quantity and a deviation of 1% in finished size. In this example, the deviations do not satisfy the exact baseline match tolerance (because there is no acceptable deviation in finished size and because the deviation in quantity exceeds 2%), but the deviations do satisfy the similar baseline match tolerance. As such, the respective fulfilled item, after the steps described in (i), (ii), and (iii) above, would be designated as a similar baseline match candidate.

Optionally, the print procurement application performs an additional determination as to whether the deviations satisfy the inferred baseline match tolerance and in accordance with a determination that the deviations satisfy the inferred baseline match tolerance, the print procurement application designates (712) the respective fulfilled item as an inferred baseline match. In some embodiments, if the respective fulfilled item has already been designated as an exact or similar baseline match candidate, then the print procurement application does not conduct the additional determination.

In some embodiments, in accordance with a determination that the deviations do not satisfy the exact, similar, or inferred baseline match tolerances, the print procurement application designates (714) the respective fulfilled item as no baseline match. In some embodiments, the operations describe above with respect to 710 are initiated in response to user input. For example, 710 is initiated in response to user selection of a line item within a print job using select line item 870 (user input 812 at select line item 870, FIG. 8J) and user selection of a baseline request affordance 754 (user input 814 at baseline request affordance 754, FIG. 8K). In some embodiments, the PPM also interacts with the print procurement application to indicate that the first item is an item for which baseline candidates should be identified, for example, by selecting the baseline indication affordance (or checkbox) 775 (user input 810 at baseline indication affordance 875, FIG. 8I).

In some embodiments, the print procurement application displays (716), on a display (e.g., display 208 of user computing device 102-1, FIGS. 6A-6C), each respective fulfilled item and an indication as to whether each respective fulfilled item has been designated as an exact baseline match, a similar baseline match, or an inferred baseline match. An exemplary display of each respective fulfilled item is shown in FIG. 8L (e.g., baseline candidates user interface 885). In some embodiments, only those fulfilled items that have been designated as either a similar, exact, or inferred baseline match are displayed and, thus, no baseline match items are included in the baseline candidates user interface 885. In some embodiments, baseline candidates user interface 885 allows the PPM to quickly (A) calculate baselines or to (B) re-designate any of the baseline candidates.

As to option (A), in some embodiments, the print procurement application receives (718) user input, at a location (e.g., a location on the display while it is displaying the baseline candidates UI 885, FIG. 8L) that corresponds to one of the respective fulfilled items that has been designated as either a similar or an inferred baseline match and, based on the user input, re-designates (720) the one respective fulfilled item as an exact baseline match. For example, a contact with a touchscreen display is detected at a location on a touchscreen display that corresponds to a respective fulfilled item displayed in a graphical user interface and/or an input is received while a pointer is at a location that corresponds to a respective fulfilled item displayed in a graphical user interface. In some embodiments, each of the respective fulfilled items displayed in the baseline candidates UI 885 includes a re-designate affordance (shown in FIG. 6C) that, when selected, allows the PPM to select a different baseline methodology for the selected fulfilled item (i.e., change the baseline methodology from similar/inferred to exact). In some embodiments, the PPM first selects one of the respective fulfilled items that are displayed in the baseline candidates user interface 885 (e.g., user input 816, FIG. 8L) and then selects a re-designate element (dropdown) 878 that is shown on a baseline calculator user interface (e.g., baseline calculator user interface 886-1, FIG. 8M) that allows for selection of a new type of baseline methodology. In this way, the PPM is able to flexibly configure the types of baseline methodologies and provide user input to quickly and easily modify a respective type of baseline methodology assigned to a respective fulfilled item, if needed or required. Additional details regarding re-designating baseline match candidates are provided above in reference to FIG. 6C.

As shown in FIG. 8M, baseline cost and max client sell information are not listed until the PPM enters current bid information for the baseline candidate. For example, and continuing the discussion of option B above, the print procurement application receives (722) a selection of one of the respective fulfilled items from a user interface (e.g., baseline candidates user interface 885, FIG. 8L) displayed on the display of the electronic device. In some embodiments, the selection is received when the PPM selects a baseline match candidate from baseline candidates user interface 885 (e.g., user input 816, FIG. 8L), enters current bid details for the baseline match candidate (e.g., enters the information in baseline calculator user interface 886-1), and then selects a calculate button (e.g., user input 818, FIG. 8M). In response to receiving the selection, the print procurement application proceeds to determine a baseline price for the first item based on whether the selected fulfilled item was an exact, similar, or inferred baseline match. In accordance with a determination that the selected fulfilled item has been designated as an exact baseline match, the print procurement application determines a baseline price for the first item using a first baseline price metric. In accordance with a determination that the selected fulfilled item has been designated as a similar or an inferred baseline match, the print procurement application determines a baseline price for the first item using a second baseline price metric that is distinct from the first baseline price metric. Exemplary baseline price metrics are provided below.

In some embodiments, the first and second price metrics are computed using a number of equations. The equations are used to compute values for the following baseline-related metrics that are shown in the table below:

TABLE 1 baseline-related metrics and acronyms

Max Client Sell = MCS
Baseline Cost = BC
Contract Margin (not percent, decimal) = CM
IW Target Cost = IWTC
Contract Savings (not percent, decimal) = CS
Gainshare = GS
IW Actual Cost = IWAC
Gainshare decimal to INWK = GSINWK
Gainshare decimal to Client = GSCL
Gainshare dollars to INWK = GSINWK$
Gainshare dollars to Client = GSCL$
Client previously paid record: CPPR
Client Previously paid quantity: CPPQ
Client Previously paid per unit price: CPPPUP
Current Qty: CIQ
Current per Unit Cost: CIPUC
Current Similar Bid Cost: CIWCCBQ
Current Cost for New Qty: CIWCNQ
Similar/Inferred per Unit cost: SPUC
Similar/Inferred per Unit Cost: SNPUC As one example of the first baseline price metric, the below equations are used to compute values for the baseline-related metrics of Table 1, in order to arrive at the baseline price:

TABLE 2

Exemplary Exact Match Baseline Equations

CPPR/CPPQ = CPPPUP
CPPPUP × CIQ = BC
MCS = BC × (1 − CS)
IWTC = MCS × (1 − CM)
GS = IWTC − IWAC
GSINWK = 1 − GSCL
GSINWK$ = (1 − GSCL) × GS
GSCL$ = GS − GSINWK$

As one example of the second baseline price metric, the below equations are used to compute values for the baseline-related metrics of Table 1, in order to arrive at the baseline price:

TABLE 3

Exemplary Similar/Inferred Match Baseline Equations (CIWCCBQ + CS)/CPPQ = SPUC
CIWCNQ/CIQ = CIPUC
[(SPUC − CIPUC)/CIPUC] × CPPR =

TABLE 3-continued

Exemplary Similar/Inferred Match Baseline Equations

SNPUC
SNPUC × CIQ = BC
MCS = BC × (1 − CS)
IWTC = MCS × (1 − CM)
GS = IWTC − IWAC
GSINWK = 1 − GSCL
GSINWK$ = (1 − GSCL) × GS
GSCL$ = GS − GSINWK$

Turning now to FIG. 8N, the baseline price calculator user interface is updated to include the determined baseline price (e.g., by updating the baseline cost and max client sell fields in baseline calculator user interface 886-1, FIG. 8M, and then selecting the save button). In some embodiments, in response to receiving user input at a transfer button (e.g., responsible for transferring the determined baseline and baseline cost information to one or more print procurement servers 106, such as the transfer button shown in baseline calculator UI 886-2 of FIG. 8N), the system messages 840 region is updated to indicate that the baseline information has been transferred (e.g., system messages 840 region of FIG. 8O includes text indicating the information has been transferred successfully). In some embodiments, the baseline cost data can also be accessed through a baseline detail tab user interface (e.g., baseline detail tab user interface 888, FIG. 8P).

In some embodiments, the baseline price for the first item includes (726) one or more commodities (e.g., indexed commodities) associated with a variable price (e.g., a price that varies based on pricing data provided by a third-party). In some embodiments, the print procurement application performs the following operations (728): (i) detects a change in the variable price (e.g., based on data received from the third-party), (ii) determines whether the change satisfies a price threshold, and (iii) in accordance with a determination that the change satisfies the price threshold, adjusts the baseline price (e.g., to account for the change in the variable price of the indexed commodity).

In some embodiments, the process described above with respect to FIGS. 7A-7B does not locate any baseline match candidates. As such, in some embodiments, the print procurement application proceeds to conduct a multi-item baseline. A multi-item baseline allows the print procurement application to compare print specifications associated with more than one item (e.g., not just a first item but a first and a second item) with groups of fulfilled items. In this way, the print procurement application is able to group items together in order to locate fulfilled items that may serve as an appropriate baseline match.

It should be understood that the particular order in which the operations in FIGS. 7A-7B have been described is merely exemplary and is not intended to indicate that the described order is the only order in which the operations could be performed. One of ordinary skill in the art would recognize various ways to reorder and/or combine the operations described herein. Additionally, it should be noted that other processes can be combined with the processes described in FIGS. 7A-7B.

In some embodiments, the print procurement application described above (and, in particular, in reference to FIGS. 7A-7B) allows for combining multiple print projects together into a single print job in a print procurement system. In this way, the print procurement application is able to efficiently fulfill print jobs, reduce costs, and conserve print resources by combining similar jobs with similar print specifications.

Figure 9:
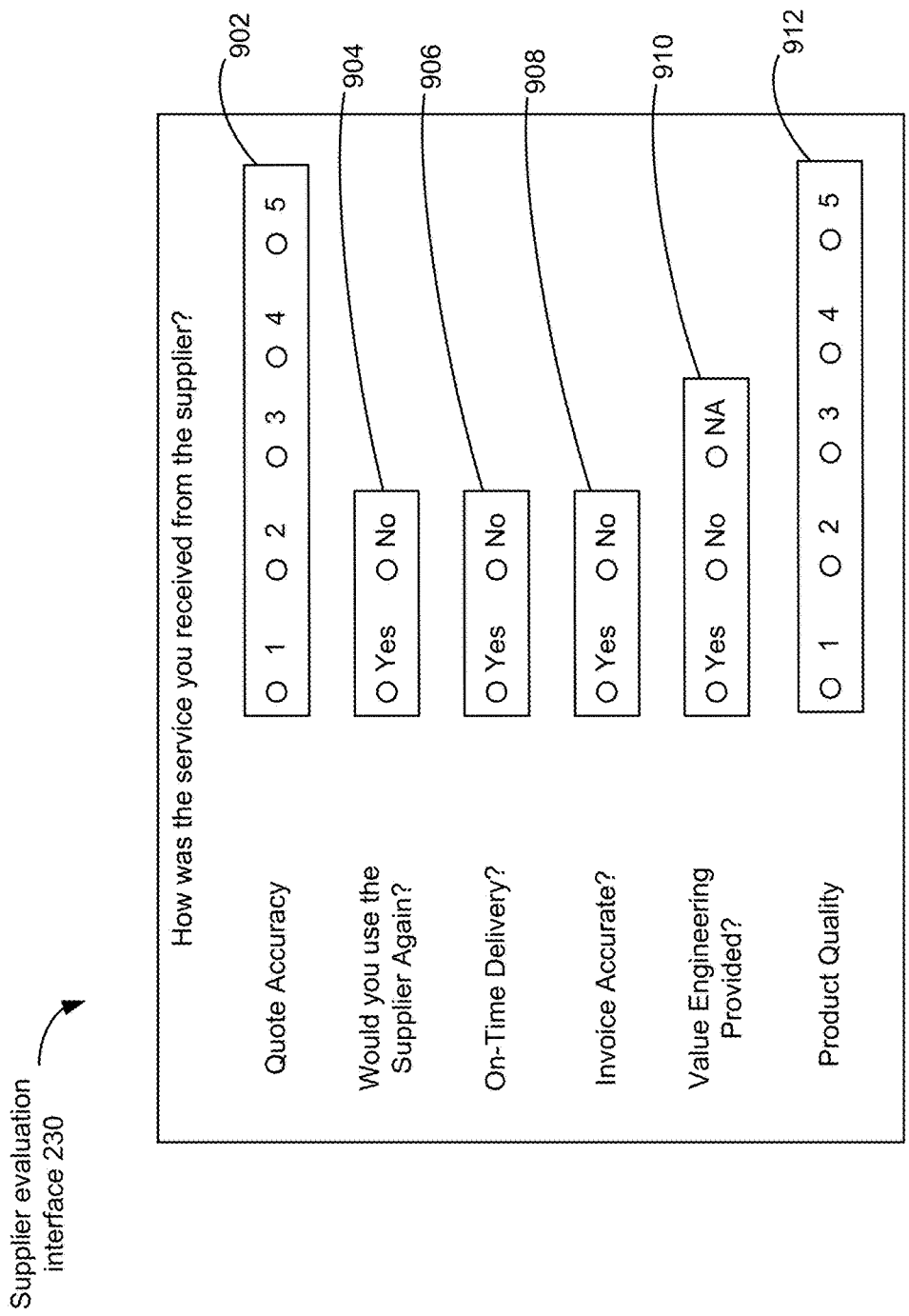
FIG. 9 illustrates a supplier evaluation interface, in accordance with some embodiments.

FIG. 9 illustrates a supplier evaluation interface 230, in accordance with some embodiments. In some embodiments, print procurement application 224 provides a supplier evaluation interface 230 (e.g., displayed by a display 208 of a user device 102) that allows PPMs and other users to evaluate service provided by a supplier. In some embodiments, supplier evaluation interface 230 is displayed to a user (e.g., PPM, project manager, and/or account manager) at the time that the supplier invoice is sent to the user.

Supplier evaluation interface 230 includes, e.g., prompts to provide an evaluation criteria value for evaluation criteria such as the evaluation criteria listed in Table 1 below:

TABLE 4

User Input Evaluation Criteria

| Name | Type | Description | Min. Value | Max. Value |
|------|------|-------------|------------|------------|
| Quote accuracy | Score | Whether supplier's initial response to the RFQ was usable or required interpretation and/or follow-up. | 1 | 5 |
| PPM score | Range | Would PPM use supplier again | −1 | +1 |
| Product Quality | Score | PPM's evaluation of quality of product | 1 | 5 |
| On-time Delivery | Range | Was the delivery from the supplier received at the time indicated in the supplier's delivery commitment? | −1 | +1 |
| Invoice accuracy | Range | Did the supplier invoice accurately reflect what was requested in the purchase order? (E.g., a "no" response is provided when the supplier sends an invoice that includes the cost of too many produced "overs" or when a particular cost for a particular item or service is included in the invoice after a previous agreement that the particular cost would not be included) | −1 | +1 |
| Value Engineering Services | Range | Did the supplier offer value engineering (e.g., altered specifications in a way that reduced cost or created better product)? | −1 | +1 |

In some embodiments, the value +1 corresponds to a "yes" response, the value 0 corresponds to an N/A response, and the value −1 corresponds to a "no" response. For example, when a "yes" input is received at user input control 910, supplier evaluation module 326 of server 106-1 stores a value of 1.

In some embodiments, supplier evaluation interface 230 includes input control 902 for receiving a user input value that corresponds to quote accuracy, input control 904 for receiving a user input value that corresponds to PPM score, input control 906 for receiving a user input value that corresponds to on-time delivery, input control 908 for receiving a user input value that corresponds to invoice accuracy, input control 910 for receiving a user input value that corresponds to value engineering services, and/or input control 912 for receiving a user input value that corresponds to product quality. While radio button input controls are shown in the illustrative example of FIG. 9, it will be recognized that drop down menus, text input fields, or other controls (including sequentially presented windows or other prompts) could be used to receive user input values for the user input evaluation criteria.

In some embodiments, when input is received at a respective input control of input controls 902-912, a user is prompted to provide a comment. For example, when a user provides an input indicating a value of 1 or a value of 5 at input control 912, the user is automatically prompted to provide a comment pertaining to the provided input.

In some embodiments, when input is received at a respective input control of input controls 902-912, a notification is sent to a remote device. For example, when a user provides an input indicating a value of 1 or a value of 5 at input control 912, a notification is automatically generated (e.g., for transmission to a facilitator user device and/or a supplier user device).

Supplier evaluation module 326 of server 106-1 receives and stores the user input evaluation values. In some embodiments, one or more values provided via supplier evaluation user interface 230 are only provided to facilitator personnel and are not visible to other users (e.g., other customers and/or suppliers). For example, input provided at PPM score input 904 is not visible to users other than facilitator personnel. In some embodiments, supplier evaluation module 326 combines (e.g., averages) one or more values provided via supplier evaluation user interface with values provided by other users for display to PPMs and suppliers.

In some embodiments, a user input evaluation value (e.g., product quality) for a particular invoice is determined using values provided by the user at two different times. For example, the user is prompted to provide a product quality score at the time that the supplier invoice is reviewed and again at a different time (e.g., three weeks from the date that the supplier invoice is reviewed). For example, the application generates an alert to the PPM to provide a score at a date that is after the date that the supplier invoice is reviewed. In this way, the product quality score takes into account quality issues that are discovered after evaluation values are initially provided.

In some embodiments, one or more elements of supplier evaluation interface 230 are rearranged each time the interface is displayed to discourage quick or arbitrary data input.

In some embodiments, supplier evaluation module 326 determines one or more system-generated evaluation criteria values for evaluation criteria such as the evaluation criteria listed in Table 5 below:

TABLE 5

System-generated Evaluation Criteria

| Name | Type | Description | Min. Value | Max. Value |
|------|------|-------------|------------|------------|
| Bid response | Percentage | Percent of time supplier responds to a bid (including no bid response) | 0% | 100% |
| Quote response speed | Time in hours | Quote turn speed (hours) - outbound to inbound measurement | 0 hours | 336 hrs. (14 days) |
| Invoice speed | Time in hours | Speed with which invoice provided from supplier to invoice recipient (e.g., difference between shipment date and invoice date) | 0 hours | 8765 hrs. (1 year) |
| Portal invoicing | Percentage | Percent of supplier invoices submitted through supplier portal | 0% | 100% |
| Low bidder | Percentage | Percent of quotes where the supplier offered the lowest bid | 0% | 100% |

TABLE 5-continued

System-generated Evaluation Criteria

| Name | Type | Description | Min. Value | Max. Value |
|---|---|---|---|---|
| Winning quote | Percentage | Win ratio (e.g., percentage of quotes that become fulfilled jobs | 0% | 100% |
| Award trend | Calculated number range | Number jobs awarded in past 3, 6, and/or 12 months | 0 | Infinity |
| Profile completeness | Percentage | Completeness of supplier profile (e.g., number of profile fields completed). | 0% | 100% |
| Unsolicited bidding | Percentage | Percent of jobs sourced through portal - i.e., unsolicited bids | 0% | 100% |
| Job Status Updates | Percentage | Number of times supplier updated divided by number of times supplier was required to update | 0% | 100% |

Minimum and maximum values provided in the system-generated evaluation criteria table and the user input evaluation criteria table are examples. It will be recognized that other values and rating systems may be used for the various evaluation criteria.

In some embodiments, system-generated evaluation criteria values (and/or values determined based on representative system-generated evaluation values, such as on-time delivery (see FIG. 10)) are determined when a PPM submits a request for a quote, when a supplier submits a response to a request for a quote, when a supplier ships a product, when a supplier transmits an invoice, and/or bidding phase and/or when a supplier rankings interface 232 is displayed.

Figure 10:
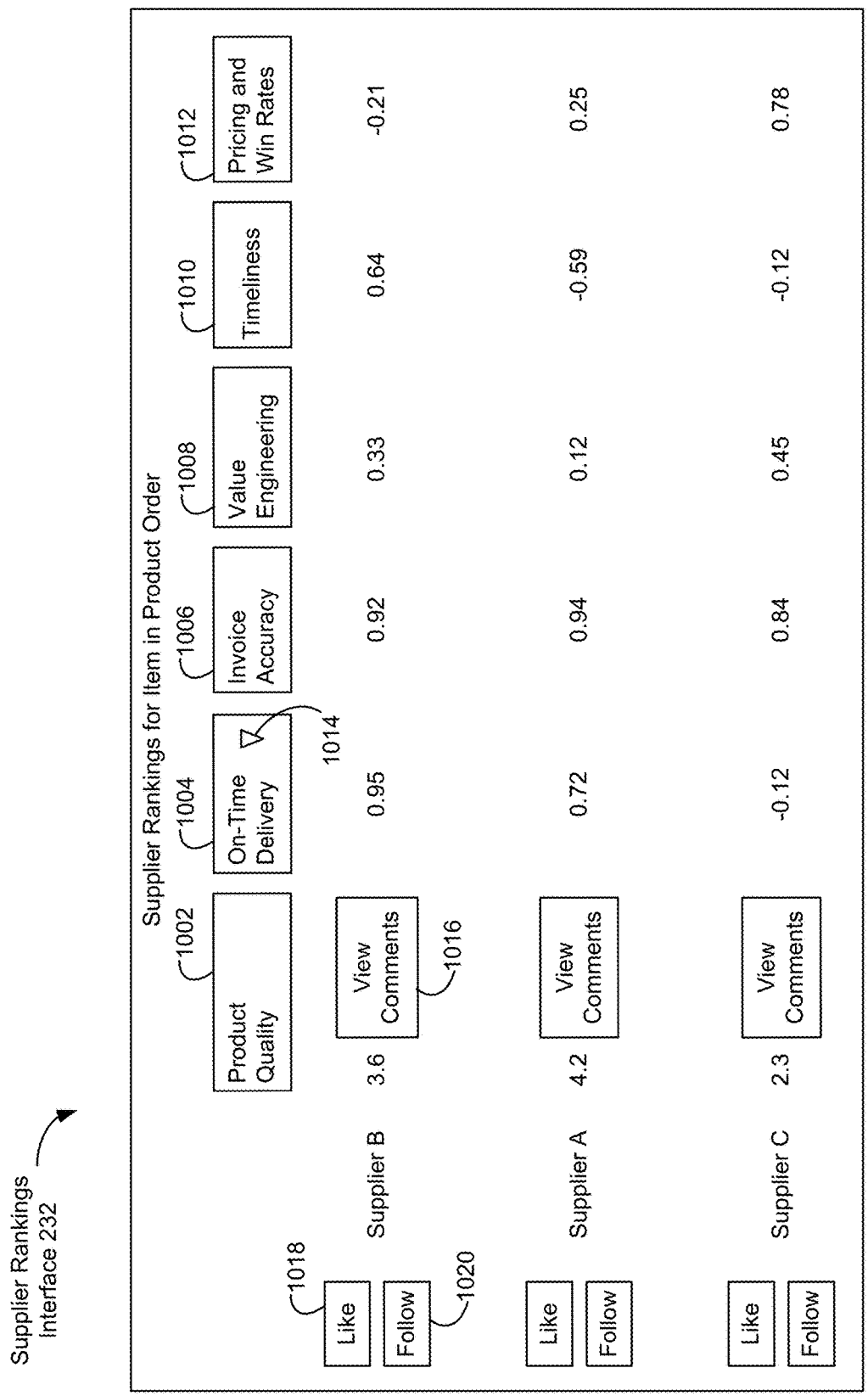
FIG. 10 illustrates a supplier rankings interface, in accordance with some embodiments.

FIG. 10 illustrates a supplier rankings interface 232, in accordance with some embodiments. In some embodiments, print procurement application 224 provides a supplier rankings interface 232 (e.g., displayed by a display 208 of a user device 102) that indicates information about suppliers, such as evaluation values provided by users and/or determined by a system for suppliers.

In some embodiments, supplier evaluation module 326 calculates scores for each supplier in the system that has bid on and/or produced a product that is included in a product order. In some embodiments, a supplier rakings interface 232 includes, for one more products in a product order, a list of all or fewer than all of the suppliers of the product. In some embodiments, combined and/or representative values for one or more evaluation criteria are provided for each listed supplier of the product. In some embodiments, the suppliers are listed in accordance with a ranking order determined using the one or more evaluation criteria. In some embodiments, suppliers who have not bid on or produced a product in the product order are listed with the indication "No Activity."

For example, supplier rankings interface 232 displays evaluation values determined for product quality, on-time delivery, invoice accuracy, value engineering, timeliness, and pricing and win rates, for suppliers Supplier A, Supplier B, and Supplier C. In some embodiments, supplier rankings interface 232 includes one or more sort controls, such as product quality sort control 1002, on-time delivery sort control 1004, invoice accuracy sort control 1006, value engineering sort control 1008, timeliness sort control 1010, and/or pricing and win rates sort control 1012. When input is received at a respective sort control of sort controls 1002-1012, suppliers are sorted according to the evaluation criterion that corresponds to the sort control. In some embodiments, subsequent inputs received at a sort control toggle the sort direction (e.g., between ascending order and descending order). For example, in response to an input received at on-time delivery sort control 1004, the suppliers are sorted in descending order in accordance with "on-time delivery" values determined for each supplier. In response to a subsequent input received at on-time delivery sort control 1004, the suppliers would be sorted in ascending order. In some embodiments, a sort direction indicator 1014 indicates a sort direction (e.g., downward pointing icon for descending sort order and upward pointing icon for ascending sort order).

In some embodiments, a view comments control 1016 is provided to allow a user to view comments pertaining to an evaluation criterion. For example, in response to an input received at a view comments control 1016 for product quality, supplier rankings interface 232 displays one or more comments provided by PPMs pertaining to product quality. For example, the displayed comments associated with a combined product quality score for a supplier include comments corresponding to three recently provided product quality scores of "5" and comments corresponding to three recently provided product quality scores of "1."

In some embodiments, a timeliness score is determined using an average quote response speed for quotes provided by a supplier and an average invoice speed of quotes provided by the supplier. For example, a first weight is applied to the average quote response speed and a second weight is applied to the average invoice speed, and the weighted values are averaged. In some embodiments, the first weight and the second weight are equal.

In some embodiments, a pricing and win rates score is determined using an average "low bidder" percentage value for quotes provided by a supplier and an average "winning quote" percentage value for quotes provided by the supplier. For example, a first weight is applied to the average low bidder percentage and a second weight is applied to the average winning quote percentage, and the weighted values are averaged. In some embodiments, the first weight and the second weight are equal.

In some embodiments, information provided for a supplier in supplier rankings interface 232 includes a notes field indicating supplier information (e.g., a supplier review). For example, the supplier information is provided by PPMs and/or a facilitator.

In some embodiments, supplier rankings interface 232 includes one or more controls for posting a reaction to a supplier, a review, and/or a comment provided for a supplier (e.g., input control 1018 to "like" Supplier B). In some embodiments, a PPM score is determined using the reactions to a supplier and/or comments for a supplier.

In some embodiments, user input to "follow" a supplier is detected, e.g., when a user input is received at a location corresponding to a follow control (e.g., follow control 1020 to follow Supplier B displayed in supplier rankings interface 232). When a user is following a supplier, the user is notified when new comments and/or reviews are posted for the supplier.

Supplier evaluation module 326 of server 106-1 receives user provided supplier evaluation input, determines evaluation values, and transmits supplier evaluation information for display by a remote device.

Figure 11A:
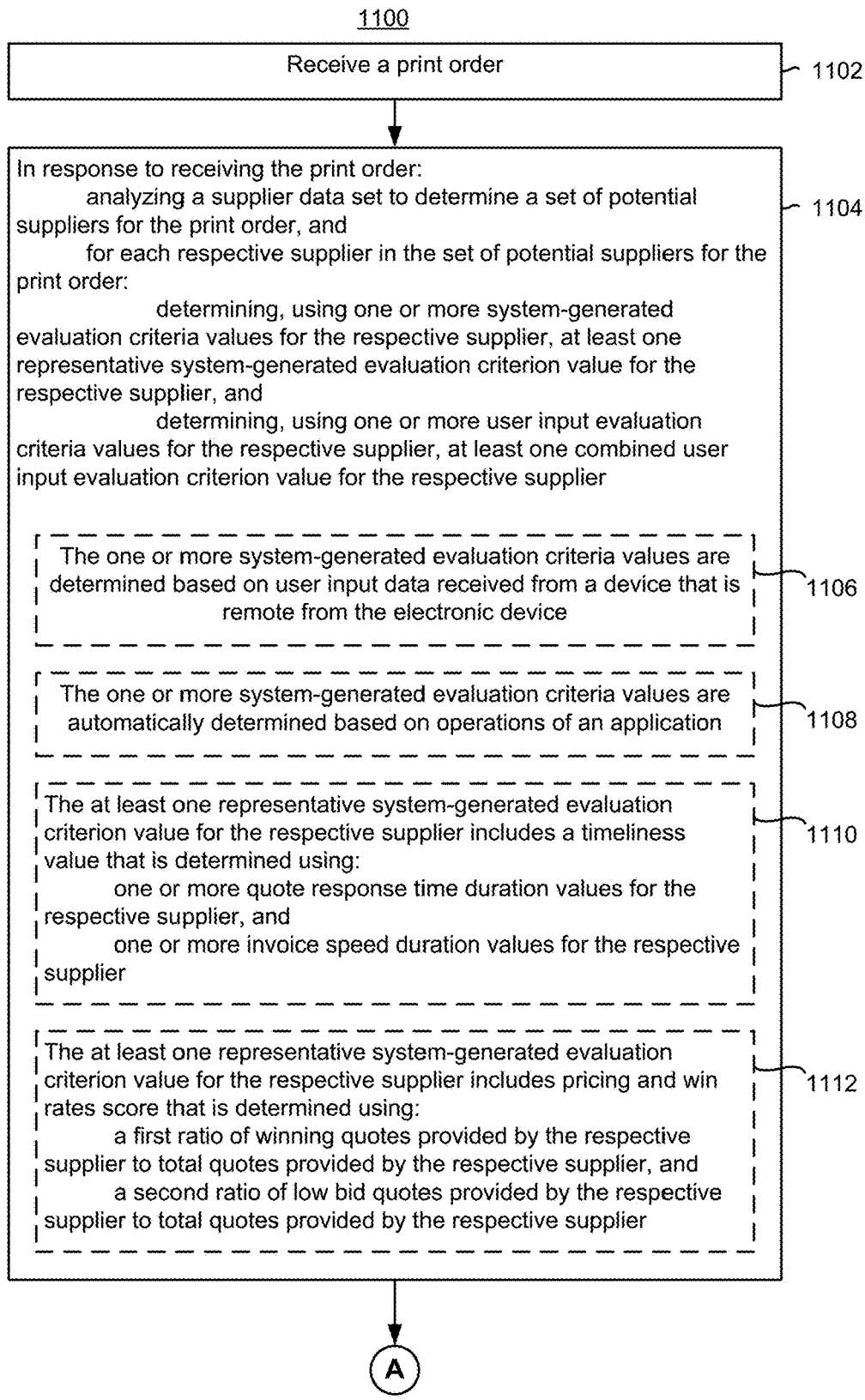
FIGS. 11A-11B are a flowchart representation of a method of displaying supplier evaluation values, in accordance with some embodiments.
Figure 11B:
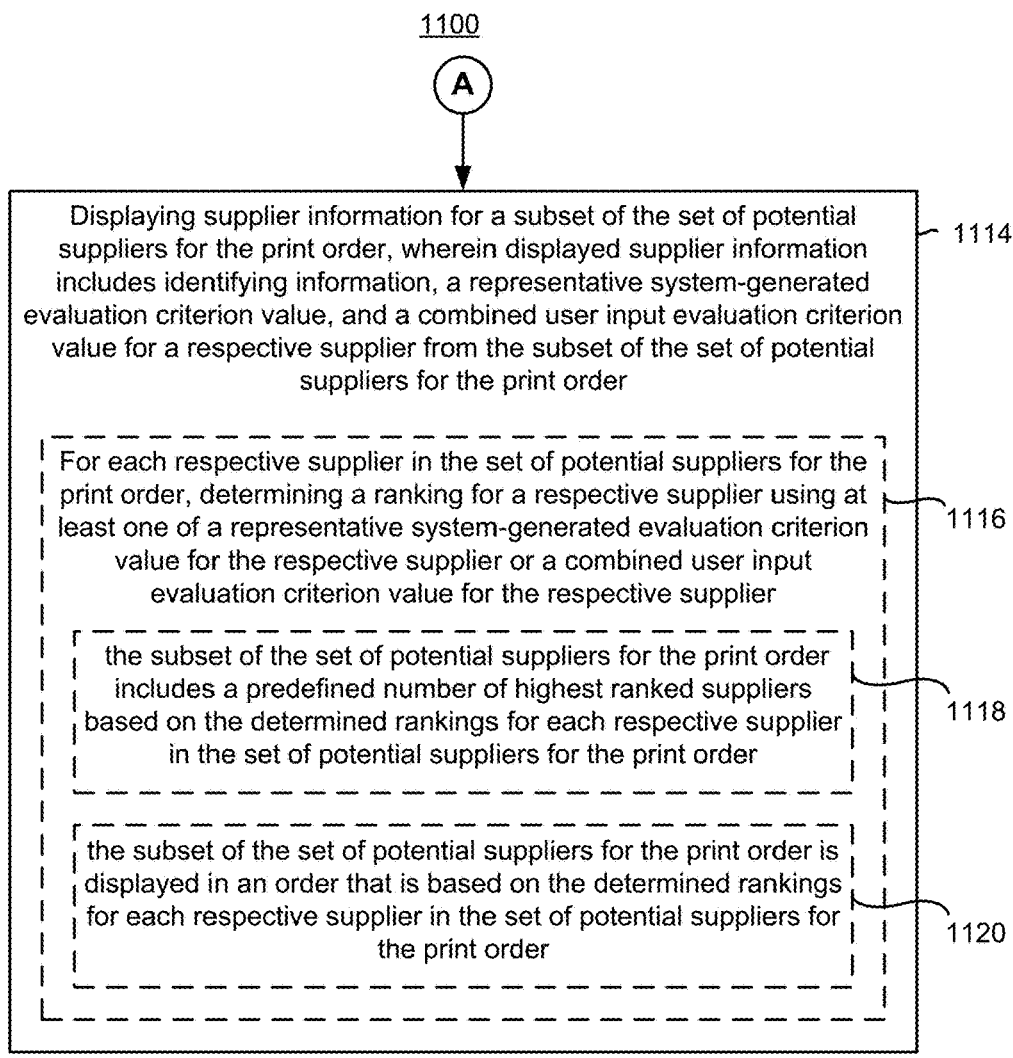

FIGS. 11A-11B are a flowchart 1100 representation of a method of displaying supplier evaluation values, in accordance with some embodiments.

In some embodiments, the method 1100 is performed by an electronic device (e.g., server 106-1, FIG. 3) and/or one or more components of the electronic device. In some embodiments, the method 1100 is governed by instructions that are stored in a non-transitory computer-readable storage medium and that are executed by one or more processors of a device, such as the one or more processors 302 of device 106-1 (FIG. 3). For ease of explanation, the following describes method 1100 as performed by the device 106-1. In some embodiments, one or more operations are performed by a user device 102. Some operations in method 1100 are, optionally, combined and/or the order of some operations is, optionally, changed.

As described below, the method 1100 uses user input evaluation information and automatically generated system-generated evaluation information to provide information that customers can use to compare and select suppliers. The approach described with regard to FIG. 11 leverages information that is automatically generated as a print procurement system is used, such as time elapsed between user actions, to generating information to be displayed in a user interface.

The device receives (1102) a print order. For example, a print order generated by print procurement application 224 is transmitted from user device 102 and received by device 106.

In response to receiving the print order, the device (1104) analyzes a supplier data set to determine a set of potential suppliers for the print order. In some embodiments, a supplier data set is, e.g., an array, database (e.g., print job database 108), portion of a database, or other data structure that includes information for multiple suppliers, including identifying information for a supplier and/or information indicating one or more products items that a supplier is capable of supplying. In some embodiments, a supplier data set is stored by print procurement server 106. In some embodiments, at least a portion of the data in a supplier data set is provided by a supplier via a supplier survey interface 234. In some embodiments, at least a portion of the data in a supplier data set is input by a user via supplier evaluation interface 230. In some embodiments, a supplier data set includes user input evaluation criteria for a supplier and/or for a product supplied by the supplier. In some embodiments, supplier data set includes system-generated evaluation criteria for a supplier and/or for a product supplied by the supplier. In some embodiments, determining a set of potential suppliers includes determining a set of suppliers that are capable of supplying at least one order item of the print order. For example, supplier survey input received via a supplier survey interface 234 is analyzed to determine whether a supplier satisfies print specifications for the order item.

In response to receiving the print order, for each respective supplier in the set of potential suppliers for the print order, the device determines (1104), using one or more system-generated evaluation criteria values for the respective supplier (e.g., as described with regard to Table 5), at least one representative system-generated evaluation criterion value for the respective supplier. In some embodiments, the at least one representative system-generated evaluation criterion value is based on one or more system-generated evaluation criteria values (e.g., values provided by one or more suppliers for a particular evaluation criterion or for multiple evaluation criteria) stored in a supplier data set for a supplier and/or a product produced by the supplier. For example, the at least one representative system-generated evaluation criterion value is an award trend value determined based on a number of jobs awarded in the three months preceding the current date. In some embodiments, supplier evaluation module 326 stores determined system generated evaluation information (e.g., to memory 214 and/or database 108) and determines a representative system-generated evaluation criterion value using the stored system-generated evaluation information.

In response to receiving the print order, for each respective supplier in the set of potential suppliers for the print order, the device determines (1104), using one or more user input evaluation criteria values for the respective supplier (e.g., as described with regard to Table 4), at least one combined user input evaluation criterion value for the respective supplier. In some embodiments, the at least one combined user input evaluation criterion value is based on one or more user input evaluation criteria values (e.g., e.g., values provided by one or more suppliers for a particular evaluation criterion or for multiple evaluation criteria) stored in a supplier data set for a supplier and/or a product produced by the supplier. For example, the at least one combined user input evaluation criterion value is an average of every invoice accuracy value provided (e.g., via supplier evaluation interface 230) by PPMs for a particular supplier. In some embodiments, supplier evaluation module 326 stores received user input evaluation information (e.g., to memory 214 and/or database 108) and determines a combined user input evaluation criterion value using the stored user input evaluation information.

In some embodiments, the one or more input evaluation criteria values are determined (1106) based on user input data received from a device (e.g., user device 102-1) that is remote from the electronic device (e.g., server 106-1). For example, user input data is received at user device 102 via supplier evaluation interface 230 and transmitted from user device 102 to server 106.

In some embodiments, the one or more system-generated evaluation criteria values are automatically determined (1108) based on operations of an application. Operations of an application include operations such as a storage event and/or a triggering event (such as print order received, quote response provided, shipping date entry occurs, invoice transmission occurs, bid determined to be low bid, bid accepted, and/or a supplier profile is completed). For example, a first time value is stored when a request for a quote is received by server 106 from a first user device 102-1 (e.g., from a PPM), and a second time value is stored when a response to the request is received by server 106 from a second user device 102-2 (e.g., from a supplier). In another example, a first time value is stored when a shipping date entry occurs, and a second time entry is stored when invoice transmission from a supplier to a PPM occurs. When a triggering event occurs, a time duration between the first time and the second time is automatically determined. In another example of an operation of an application, when a bid provided by a supplier is determined to be a low bid among multiple bids provided by multiple suppliers, a low bid counter for the supplier is automatically incremented. In a further example of an operation of an application, when a bid provided by a supplier is determined to be a winning bid (e.g., a PPM indicates acceptance of the bid via print procurement application 224), a winning bid counter for the supplier is automatically incremented.

In some embodiments, the at least one representative system-generated evaluation criterion value for the respective supplier includes (1110) a timeliness value that is determined using: one or more quote response time duration values for the respective supplier, and one or more invoice speed duration values for the respective supplier. For example, an average quote response time duration value and an average invoice speed duration value are weighted (e.g., equally weighted) and averaged.

In some embodiments, the at least one representative system-generated evaluation criterion value for the respective supplier includes (1112) a pricing and win rates score that is determined using: a first ratio of winning quotes provided by the respective supplier to total quotes provided by the respective supplier, and a second ratio of low bid quotes provided by the respective supplier to total quotes provided by the respective supplier. For example, the first ratio and the second ratio are weighted (e.g., equally weighted) and averaged.

In some embodiments, the device displays (1114) supplier information for a subset of the set of potential suppliers for the print order (e.g., every supplier in the set of potential suppliers or less than all of the suppliers in the set of potential suppliers), wherein displayed supplier information includes: (1) identifying information for a respective supplier from the subset of the set of potential suppliers for the print order, (2) a representative system-generated evaluation criterion value for the respective supplier from the subset of the set of potential suppliers for the print order, and (3) a combined user input evaluation criterion value for the respective supplier from the subset of the set of potential suppliers for the print order. For example, as described with regard to FIG. 10, supplier rankings interface 232 displays supplier information for suppliers Supplier A, Supplier B, and Supplier C. The information in FIG. 10 includes identifying information for a respective supplier (e.g., "Supplier A"), a representative system-generated evaluation criterion value for the respective supplier (e.g., a timeliness value of −0.59), and a combined user input evaluation criterion value for the respective supplier (e.g., a product quality value of 4.2).

In some embodiments, for each respective supplier in the set of potential suppliers for the print order, the device determines (1116) a ranking for a respective supplier using at least one of a representative system-generated evaluation criterion value for the respective supplier or a combined user input evaluation criterion value for the respective supplier. For example, as described with regard to FIG. 10, a ranking for suppliers Supplier A, Supplier B, and Supplier C is determined based on a representative on-time delivery value (determined based on a combination of a system-generated quote response speed evaluation criterion and a system-generated invoice speed evaluation criterion) in response to input received at control 1004. If a user were to provide input at invoice accuracy control 1006, Supplier A, Supplier B, and Supplier C would be re-ranked according to combined user-input invoice accuracy evaluation for the supplier. In some embodiments, the number of suppliers for which rankings are determined is greater than the number of suppliers displayed in supplier rankings interface 232. In this way, the suppliers to be displayed in supplier rankings interface 232 can be limited to a predetermined number of highest ranked suppliers.

In some embodiments, the subset of the set of potential suppliers for the print order includes (1118) a predefined number of highest ranked suppliers (e.g., three suppliers, as shown in FIG. 10) based on the determined rankings for each respective supplier in the set of potential suppliers for the print order.

In some embodiments, the subset of the set of potential suppliers for the print order is displayed (1120) in an order that is based on the determined rankings for each respective supplier in the set of potential suppliers for the print order. For example, in FIG. 10, suppliers Supplier A, Supplier B, and Supplier C are displayed in descending order based on on-time delivery value rankings.

It should be understood that the particular order in which the operations in FIGS. 11A-11B have been described is merely exemplary and is not intended to indicate that the described order is the only order in which the operations could be performed. One of ordinary skill in the art would recognize various ways to reorder and/or combine the operations described herein. Additionally, it should be noted that other processes can be combined with the processes described in FIGS. 11A-11B.

In some embodiments, a supplier portal includes one or more graphical user interfaces to display information to suppliers and receive input from suppliers. Suppliers use the supplier portal to, e.g., provide business information, search requests for quotes, respond to requests for quotes, view the statuses of quotes, receive notifications (e.g., notifications about new requests for quotes and/or accepted bids), provide status updates to PPMs, and/or perform invoicing.

In some embodiments, a supplier portal includes a supplier survey interface 234 that can be used by suppliers to indicate and/or edit information regarding the supplier's equipment, capabilities, and/or production capacity. For example, the interface is used to indicate product specifications (e.g., poster size) that can be fulfilled by the supplier. In some embodiments, when an edit is made to equipment or capabilities for a supplier, an automatic notification is generated (e.g., by a supplier survey module 328 of server 106) for transmission to a facilitator and/or any PPM who is following the supplier (e.g., as described above with regard to follow control 1020 of FIG. 10).

Supplier survey interface 234 includes one or more fields for receiving information entered by suppliers. The information includes, e.g., equipment information (e.g., for one or more types of production equipment owned by the supplier: an equipment identifier, an equipment count, and/or information indicating one or more locations of the equipment), information indicating types of products that the supplier is able to produce (e.g., posters, banners, brochures, calendars, business cards, etc.), types of substrates used by a supplier (e.g., vinyl, paper, etc.), and/or dimensions of products that the supplier is able to produce (e.g., for one or more types of equipment, one or more product types, and/or one or more substrate types: a height, width, minimum quantity and/or maximum quantity).

In some embodiments, a supplier survey design tool (e.g., supplier survey management interface 236) allows a system user (e.g., a PPM or other customer personnel, and/or personnel from a facilitating entity) to configure and/or manage the fields that appear in the supplier survey interface 234. In some embodiments, a supplier is enabled to add fields to the supplier survey interface 234, and supplier survey management interface 236 allows configuration of the fields that are available for a supplier to add to the interface.

In some embodiments, suppliers are enabled to upload certifications and/or classifications (e.g., minority owned business, forest stewardship council, international standards organization, etc.) via supplier survey interface 234. In some embodiments, a scan of a current certification document is required to be entered via the interface 234 for verification of authenticity.

In some embodiments, supplier survey interface 234 displays supplier certifications and/or provides controls for a supplier to edit certification information.

In some embodiments, a facilitating entity stores customer preferences and/or required certifications (e.g. at print procurement server(s) 106) to allow suppliers to be matched with customers. In some embodiments, supplier information is displayed to customers in accordance with customer preferences and/or required certifications. For example, if a PPM indicates a preference for printing with a particular type of equipment, the information is used to filter suppliers in accordance with equipment information provided via supplier survey interface 234.

In some embodiments, a facilitating entity uses a supplier survey management interface 236 to perform supplier survey approval before responses received from a supplier via supplier survey interface 234 are available for viewing by a PPM. For example, when a supplier completes a survey, a report is generated (e.g., in tabular form) that indicates the information provided by a supplier. Typically, the report is generated in an easily readable format that allows a facilitator to quickly review the entered information.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

It will also be understood that, although the terms "first," "second," etc. may be used herein to describe various elements, these elements should not be limited by these terms. These terms are only used to distinguish one element from another. For example, a first region could be termed a second region, and, similarly, a second region could be termed a first region, without changing the meaning of the description, so long as all occurrences of the "first region" are renamed consistently and all occurrences of the "second region" are renamed consistently. The first region and the second region are both regions, but they are not the same region.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of generating and displaying baseline candidates in a print procurement system, comprising:
   at an electronic device with one or more processors, a display, and memory, wherein the electronic device is in communication with an input device:
   receiving, via the input device within a user interface displayed on the display of the electronic device, from a user of the electronic device, a request to view baseline candidates for a first set of print specifications associated with a first item in a first product category;
   in response to receiving the request:
   retrieving, from the print procurement system, historical purchasing information about a plurality of fulfilled items in the first product category;
   displaying, by the one or more processors, within the user interface on the display, a respective user interface object for each fulfilled item of the plurality of fulfilled items;
   while displaying the respective user interface objects for each fulfilled item of the plurality of fulfilled items, retrieving, from the print procurement system, an exact baseline match tolerance and a similar baseline match tolerance associated with the first item;
   for each fulfilled item in the plurality of fulfilled items:
   identifying deviations in print specifications associated with a respective fulfilled item when compared to the first set of print specifications;
   in accordance with a determination that the deviations satisfy the exact baseline match tolerance, designating the respective fulfilled item as an exact baseline match;
   in accordance with a determination that the deviations satisfy the similar baseline match tolerance, designating the respective fulfilled item as a similar baseline match; and
   updating, by the one or more processors, the respective user interface object within the user interface that is displayed on the display corresponding to the respective fulfilled item to indicate whether the respective fulfilled item has been designated as an exact baseline match or a similar baseline match based on the determinations as to whether the deviations satisfy the exact and similar baseline match tolerances,
   wherein the determination that the deviations satisfy the exact baseline match tolerance and the determination that the deviations satisfy the similar baseline match tolerance are performed by the electronic device and/or the print procurement system in accordance with bandwidth usage at the electronic device.

2. The method of claim 1, wherein retrieving includes retrieving an inferred baseline match tolerance and the method further comprises:
   in accordance with a determination that the deviations satisfy the inferred baseline match tolerance, designating the respective fulfilled item as an inferred baseline match.

3. The method of claim 2, further comprising:
   updating, by the one or more processors, the respective user interface object on the display corresponding to the respective fulfilled item to indicate whether the respective fulfilled item has been designated as an exact baseline match, a similar baseline match, or an inferred baseline match.

4. The method of claim 3, further comprising:
   detecting user input at a location corresponding to one of the respective fulfilled items that has been designated as either a similar or an inferred baseline match; and
   based on the user input, re-designating the one respective fulfilled item as an exact baseline match.

5. The method of claim 3, further comprising:
   receiving a selection of one of the respective fulfilled items from the display of the electronic device;

in accordance with a determination that the selected fulfilled item has been designated as an exact baseline match, determining a baseline price for the first item using a first baseline price metric; and in accordance with a determination that the selected fulfilled item has been designated as a similar or an inferred baseline match, determining a baseline price for the first item using a second baseline price metric that is distinct from the first baseline price metric.

6. The method of claim 5, wherein the baseline price for the first item includes one or more commodities associated with a variable price.

7. The method of claim 6, further comprising:
detecting a change in the variable price;
determining whether the change satisfies a price threshold; and
in accordance with a determination that the change satisfies the price threshold, adjusting the baseline price.

8. The method of claim 3, further comprising, in accordance with a determination that the deviations do not satisfy the exact, similar, and inferred baseline match tolerances, designating the respective fulfilled item as no baseline match.

9. The method of claim 2, wherein the exact baseline match tolerance specifies a first plurality of deviations from the first set of print specifications, the similar baseline match tolerance specifies a second plurality of deviations from the first set of print specifications, and the inferred baseline match threshold specifies a third plurality of deviations from the first set of print specifications and further wherein the third plurality of deviations includes more deviations than the first plurality and the second plurality of deviations and the second plurality of deviations includes more deviations than the first plurality of deviations.

10. The method of claim 1, wherein the first set of print specifications includes quantity, finished size, flat size, paper weight, paper type, print colors, coating information, basic finishing information, complex finishing information, packing information, delivery information, proofing information, substrate selection information, ink information, and kitting information.

11. The method of claim 1, wherein retrieving the historical purchasing information about the plurality of fulfilled items in the first product category includes retrieving corresponding invoice data associated with the plurality of fulfilled items in the first product category and the method further comprises:
discarding historical purchasing information about a respective fulfilled item of the plurality of fulfilled items in accordance with a determination that the historical purchasing information does not match the corresponding invoice data associated with the respective fulfilled item of the plurality of fulfilled items.

12. An electronic device, comprising:
a display;
memory;
one or more processors; and
memory storing one or more programs, which when executed by the one or more processors cause the electronic device to:
receive, via an input device within a user interface displayed on the display of the electronic device, from a user of the electronic device, a request to view baseline candidates for a first set of print specifications associated with a first item in a first product category;
in response to receiving the request:
retrieve, from the print procurement system, historical purchasing information about a plurality of fulfilled items in the first product category;
display, within the user interface on the display, a respective user interface object for each fulfilled item of the plurality of fulfilled items;
while displaying the respective user interface objects for each fulfilled item of the plurality of fulfilled items, retrieve, from the print procurement system, an exact baseline match tolerance and a similar baseline match tolerance associated with the first item;
for each fulfilled item in the plurality of fulfilled items:
identify deviations in print specifications associated with a respective fulfilled item when compared to the first set of print specifications;
in accordance with a determination that the deviations satisfy the exact baseline match tolerance, designate the respective fulfilled item as an exact baseline match;
in accordance with a determination that the deviations satisfy the similar baseline match tolerance, designate the respective fulfilled item as a similar baseline match; and
update the respective user interface object within the user interface that is displayed on the display corresponding to the respective fulfilled item to indicate whether the respective fulfilled item has been designated as an exact baseline match or a similar baseline match based on the determinations as to whether the deviations satisfy the exact and similar baseline match tolerances,
wherein the determination that the deviations satisfy the exact baseline match tolerance and the determination that the deviations satisfy the similar baseline match tolerance are performed by the electronic device and/or the print procurement system in accordance with bandwidth usage at the electronic device.

13. The electronic device of claim 12, wherein retrieving includes retrieving an inferred baseline match tolerance and the method further comprises:
in accordance with a determination that the deviations satisfy the inferred baseline match tolerance, designating the respective fulfilled item as an inferred baseline match.

14. The electronic device of claim 13, further comprising:
updating, by the one or more processors, the respective user interface object on the display corresponding to the respective fulfilled item to indicate whether the respective fulfilled item has been designated as an exact baseline match, a similar baseline match, or an inferred baseline match.

15. The electronic device of claim 14, further comprising:
detecting user input at a location corresponding to one of the respective fulfilled items that has been designated as either a similar or an inferred baseline match; and
based on the user input, re-designating the one respective fulfilled item as an exact baseline match.

16. The electronic device of claim 14, further comprising:
receiving a selection of one of the respective fulfilled items from the display of the electronic device;
in accordance with a determination that the selected fulfilled item has been designated as an exact baseline match, determining a baseline price for the first item using a first baseline price metric; and
in accordance with a determination that the selected fulfilled item has been designated as a similar or an inferred baseline match, determining a baseline price for the first item using a second baseline price metric that is distinct from the first baseline price metric.

17. The electronic device of claim 16, wherein the baseline price for the first item includes one or more commodities associated with a variable price.

18. The electronic device of claim 17, further comprising: detecting a change in the variable price;
determining whether the change satisfies a price threshold; and
in accordance with a determination that the change satisfies the price threshold, adjusting the baseline price.

19. The electronic device of claim 14, further comprising, in accordance with a determination that the deviations do not satisfy the exact, similar, and inferred baseline match tolerances, designating the respective fulfilled item as no baseline match.

20. The electronic device of claim 13, wherein the exact baseline match tolerance specifies a first plurality of deviations from the first set of print specifications, the similar baseline match tolerance specifies a second plurality of deviations from the first set of print specifications, and the inferred baseline match threshold specifies a third plurality of deviations from the first set of print specifications and further wherein the third plurality of deviations includes more deviations than the first plurality and the second plurality of deviations and the second plurality of deviations includes more deviations than the first plurality of deviations.

21. The electronic device of claim 12, wherein the first set of print specifications includes quantity, finished size, flat size, paper weight, paper type, print colors, coating information, basic finishing information, complex finishing information, packing information, delivery information, proofing information, substrate selection information, ink information, and kitting information.

22. The electronic device of claim 12, wherein retrieving the historical purchasing information about the plurality of fulfilled items in the first product category includes retrieving corresponding invoice data associated with the plurality of fulfilled items in the first product category and the method further comprises:
discarding historical purchasing information about a respective fulfilled item of the plurality of fulfilled items in accordance with a determination that the historical purchasing information does not match the corresponding invoice data associated with the respective fulfilled item of the plurality of fulfilled items.

23. A non-transitory computer-readable storage medium storing executable instructions that, when executed by an electronic device with a touch-sensitive display, cause the electronic device to:
receive, via an input device within a user interface displayed on the display of the electronic device, from a user of the electronic device, a request to view baseline candidates for a first set of print specifications associated with a first item in a first product category;
in response to receiving the request:
retrieve, from a print procurement system, historical purchasing information about a plurality of fulfilled items in the first product category;
display, within the user interface on the display, a respective user interface object for each fulfilled item of the plurality of fulfilled items;
while displaying the respective user interface objects for each fulfilled item of the plurality of fulfilled items, retrieve, from the print procurement system, an exact baseline match tolerance and a similar baseline match tolerance associated with the first item;
for each fulfilled item in the plurality of fulfilled items:
identify deviations in print specifications associated with a respective fulfilled item when compared to the first set of print specifications;
in accordance with a determination that the deviations satisfy the exact baseline match tolerance, designate the respective fulfilled item as an exact baseline match;
in accordance with a determination that the deviations satisfy the similar baseline match tolerance, designate the respective fulfilled item as a similar baseline match; and
update the respective user interface object within the user interface that is displayed on the display corresponding to the respective fulfilled item to indicate whether the respective fulfilled item has been designated as an exact baseline match or a similar baseline match based on the determinations as to whether the deviations satisfy the exact and similar baseline match tolerances,
wherein the determination that the deviations satisfy the exact baseline match tolerance and the determination that the deviations satisfy the similar baseline match tolerance are performed by the electronic device and/or the print procurement system in accordance with bandwidth usage at the electronic device.

* * * * *